(12) United States Patent
Kuntz et al.

(10) Patent No.: US 7,162,198 B2
(45) Date of Patent: *Jan. 9, 2007

(54) CONSOLIDATED ONLINE ASSESSMENT SYSTEM

(75) Inventors: David L. Kuntz, Yardley, PA (US); Preston Cody, Lawrenceville, NJ (US); Georgi Stefanov Ivanov, Ringoes, NJ (US); John E. Perlow, Brick, NJ (US)

(73) Assignee: Educational Testing Service, Princeton, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 10/948,985

(22) Filed: Sep. 23, 2004

(65) Prior Publication Data

US 2005/0037326 A1 Feb. 17, 2005

(51) Int. Cl.
*G09B 7/00* (2006.01)

(52) U.S. Cl. .................. 434/353; 434/322; 434/323

(58) Field of Classification Search ............... 434/353, 434/322, 323
See application file for complete search history.

(56) References Cited

U.S. PATENT DOCUMENTS

| | | | |
|---|---|---|---|
| 4,978,305 A | 12/1990 | Kraft | |
| 5,321,611 A | 6/1994 | Clark et al. | |
| 5,433,615 A | 7/1995 | Clark | |
| 5,437,554 A | 8/1995 | Clark et al. | |
| 5,458,493 A | 10/1995 | Clark et al. | |
| 5,466,159 A | 11/1995 | Clark et al. | |
| 5,558,521 A | 9/1996 | Clark et al. | |
| 5,672,060 A | 9/1997 | Poor | |
| 5,690,497 A | 11/1997 | Clark et al. | |
| 5,709,551 A | 1/1998 | Clark et al. | |
| 5,716,213 A | 2/1998 | Clark et al. | |
| 5,718,591 A | 2/1998 | Clark et al. | |
| 5,735,694 A | 4/1998 | Clark et al. | |
| 5,752,836 A | 5/1998 | Clark et al. | |
| 5,987,149 A | 11/1999 | Poor | |
| 5,987,302 A | 11/1999 | Driscoll et al. | |
| 5,991,595 A | 11/1999 | Romano et al. | |

*Primary Examiner*—Chanda L. Harris
(74) *Attorney, Agent, or Firm*—W. Joseph Melnik; Pepper Hamilton LLP

(57) ABSTRACT

A Consolidated Online Assessment System (COLA System) that creates, manipulates, and distributes an objected-oriented paradigm that represents the scoring and related activities as a unified and integrated family of loosely coupled objects, most notably a "Case" representing a state-machine that replaces the constructed response from the test taker as the unit of work. The Scoring Model and associated Properties that encapsulate the business rules associated with what actions are appropriate or required for a unit of work and the Responses to the unit of work which represent the test-taker-contributed content (e.g., essays or other text-based responses, audio responses, digitized video responses, scanned images, diagrams, lessons plans, etc.) and ties that content to its creator are linked to a Distinct Scorable Unit (DSU) which represents a tree-based mechanism that connects and provides inheritability for the other primary system objects. The abstraction of the DSU allows the system to distinguish between the constructed response as test-taker contributed content and the constructed response as the carrier of state or status information as it passes through the assessment process.

13 Claims, 22 Drawing Sheets

FIG. 1

| Candidate | Prompt A (DSU 1) | Prompt B (DSU 1) | Prompt C (DSU 2) | Prompt D (DSU 2) |
|---|---|---|---|---|
| John Doe | Response | Response | Response | Response |
| John Smith | Case | | Response | Response |
| John Henry | Response | Response | Response | Response |
| | | | | |

FIG. 22

| Candidate ID. | 0092500 |
|---|---|
| COLA DSU | LITERATURE.ROM.A |
| ACCESSION NUMBER(s) | CA031101, CA031102 |
| | |
| Center Code | 17700 |
| Testing Session Date | 6/21/00 |

Topic: CA31101
Romance Literature [Form A]

*1. Select and discuss two Romantic period authors and a common theme found in both of their works. How do these student samples relate author adaptations?*

The student samples relate to author adaptations in a way that reflects their understandings of the common themes ... which are found in both of their works.
[End of Candidate Response]

Topic: CA031102
Romance Literature [Form A]

*2. Discuss the authors described in the first question in terms of their societal or historic impact. How would students be taught to appreciate these impacts?*

Students would be taught to appreciate the societal and historic impact of these authors by ... and the lesson would be complete.
[End of Candidate Response]

CONSOLIDATED ONLINE ASSESSMENT SYSTEM

CROSS REFERENCE TO RELATED APPLICATIONS

This application claims priority to U.S. patent application Ser. No. 10/098,636, filed Mar. 15,2002, titled "Consolidated On-Line Assessment System", and issued as U.S. Pat. No. 6,816,702, which is incorporated herein by reference.

TECHNICAL FIELD

The invention relates generally to systems and methods for assessment of constructed responses to test questions. More particularly, the invention relates to systems and methods for providing a highly scaleable and customizable consolidated framework for the intake, processing, annotation, benchmarking and scoring of media-rich candidate produced constructed responses to assessment prompts or other stimuli.

BACKGROUND OF THE INVENTION

Computer systems have been developed for the assessment of open-ended test responses such as essay responses. These open-ended responses are often referred to as constructed responses (CRs). CRs are not limited to handwritten or typewritten text but may also include graphics, videotape performances, audio responses, and/or other forms of responses in accordance with the type of testing being conducted. Systems are known for use in assisting human graders in scoring such CRs generated during the administration of examinations such as the SAT®, the LSAT®, the GMAT®, the National Board for Professional Teaching Standards® (NBPTS), the Test of English as a Foreign Language (TOEFL®), and the like. For example, the closest known such prior art system to the present invention is the system described in U.S. Pat. No. 5,991,595, assigned to the same assignee as the present invention. The contents of that application are hereby incorporated herein by reference.

U.S. Pat. No. 5,991,595 describes an online scoring network (OSN) for scoring constructed responses and also provides methods for training, monitoring, and evaluating human rater's scoring of such constructed responses. The OSN system described therein is characterized in part by the use of workfolders that are used to transmit a number of CRs at one time to a reader or rater for evaluation and for receiving scores from the reader for the number of CRs at one time. A processing unit organizes a number of associated CRs into an electronic work folder for distribution to raters located at a number of local or remote rater stations. The raters assess the CRs in the work folder in any order and return the work folder upon completion. Each rater may be assigned to various test sections based on the rater's qualification status, and the work folders with the appropriate categories of CRs for that rater are distributed to that rater based on the rater's qualification status.

Conventional prior art systems typically store and utilize data associated with a candidate or the candidate's CR, such as the response itself, the prompt, topic, or question to which the candidate or test-taker responded, the training materials used for that topic, the scoring procedures for the response, the score data, and other information, based on a characterization of the state or status of that data. For certain kinds of assessments or assessment related activities, particularly those involving complex content domain characterizations and media-rich candidate CRs, which require more flexible management and distribution of material, there exists a need to employ a different conceptualization of how this disparate information is stored, combined and utilized.

Prior art systems have also been designed to support an explicit categorization of constructed responses by their intended use (e.g., calibration, monitoring, training, production scoring, etc.). As a consequence, prior art systems have been designed such that the Constructed Responses so categorized must be physically moved from one database to another, or from one table structure to another as their disposition or use changes (see, e.g., FIG. 2 of U.S. Pat. No. 5,991,595 and the accompanying textual description). While this confers some advantage in a workfolder-based system by allowing workfolders to contain constructed responses from one database at a time, in non-workfolder-based systems it can prevent, make difficult, or delay the smooth transition of scoring elements from one status/state to another. Prior art systems allow one to categorize a constructed response by its use, but this categorization does not capture the process flow or work flow associated with the constructed response and its relationship to other elements of the scoring system. A system is desired that integrates the constructed responses with these other elements of the scoring system and as such eliminates the need to categorize Constructed Responses in this manner, eliminates the need to physically separate data structures associated with differently-categorized Constructed Responses, and eliminates the system overhead required to do so, without loss of the capability to distinguish the disposition of one constructed response from another.

In most prior art scoring systems, the test-taker-contributed material (the CR) is implicitly treated as the fundamental unit of work, the "thing-to-be-scored." In the system of U.S. Pat. No. 5,991,595, the CR is still the fundamental unit of work, even though those units are bundled into workfolders (collections of CRs) for distribution purposes. In conventional prior art systems there is no distinction made (nor mechanism to enable such a distinction) between the kind of CR something is, and the way that particular unit of work should be treated. Further, there is no distinction made (nor mechanism to enable such a distinction) between the CR as test-taker-contributed content and the CR as the carrier of state or status information—the status of a particular piece of test-taker-contributed material is inferred by the system from other information. A system is desired that can distinguish between the CR as test-taker-contributed content and the CR as the carrier of state or status information.

The present invention is designed to address these needs in the art.

SUMMARY OF THE INVENTION

The present invention meets the afore-mentioned and other needs in the art by providing a web-based Java Servlet Application/Applet system designed to support the evaluation of complex performance assessments of various types. The unified system dramatically reduces the number of touch points and handoffs between systems compared to prior art scoring systems and dramatically increases the administrator's ability to track candidates and their responses from test center appointment through benchmarking and scoring.

As stated above, prior art systems treat the disparate data elements associated with the scoring activity as separate and separable functional components, usually linked through traditional flat relational database structures. Because these linkages are codified in this manner, a significant level of flexibility is sacrificed, both in terms of the ease with which data elements can be combined and recombined based on changing business needs, and the ease with which new kinds of relationships can be established. The Consolidated Online Assessment System (COLA System) of the present invention overcomes these limitations through the creation, manipulation, and distribution of an objected-oriented paradigm that represents the scoring and related activities as a unified and integrated family of loosely coupled objects, most notably the Case (referred to herein as the "COLA Case") which represents a state-machine that replaces the "CR"—test-taker contributed content—as the unit of work, the Scoring Model and associated properties which encapsulates the business rules associated with what actions are appropriate or required for a unit of work, the Responses to the unit of work which represent the test-taker-contributed content (e.g., essays or other text-based responses, audio responses, digitized video responses, scanned images, diagrams, lessons plans, etc., and ties that content to its creator), and the Distinct Scorable Unit (DSU) which represents a tree-based mechanism that connects and provides inheritability for the other primary system objects.

The present invention is designed to distinguish between the thing-to-be-scored as a unit of work and the content of the thing, between the unit of work and the rules for determining the disposition of that piece of work, and between the status or state of a piece of work and the content (or scores) associated with that work. Distinguishing these elements in the manner of the present invention makes it such that it simply does not matter any longer what the particular content of a particular piece of work is to the rest of the system. For example, the design of the present invention makes it unnecessary to specify that *this* content received *this* score. Instead, what matters is that a particular Case is in a "SCORED" state, that it represents "this" content, associated with "this" DSU, which in turn indicates that it was scored using "these" rules. By re-conceptualizing the basic unit of work and by creating and connecting to this work the other entities described above, the end result is a system and methods that is extraordinarily flexible and scaleable in its support for many and varied content or knowledge domains, many and varied models for scoring, evaluating, or manipulating units of work, and many and varied kinds of test-taker-contributed material.

Those skilled in the art will appreciate that the COLA System of the invention does not suffer from the same limitations of the prior art that were addressed by the OSN System of U.S. Pat. No. 5,991,595—that is, wasted rater time and the potential business need to revise scores. The COLA System backend is highly efficient, and the COLA System front-to-back-to-front communication protocol is lightweight, which overcomes stated limitations of non-workfolder-based prior art systems. The business need for revising scores is addressed in the present invention through a COLA Case state change and the application of scoring model properties appropriate to that state.

The COLA system design further provides, among other features, integrated messaging, the capability for online assessor timesheets; improved management of handwritten candidate responses; automated identification and distribution of cases requiring more than one score; online benchmark case, training case, and recalibration case selection; web-based reporting on a variety of information important to the scoring process, including the pace of scoring and the status of every eligible candidate; and vastly improved system administration support. The development of new interfaces to connect the COLA with a main repository for candidate responses, as well as new interfaces for data transfer between the test administrator organization and other organizations also increases the overall reliability and utility of the COLA system.

Those skilled in the art will appreciate that the COLA framework is not limited to essay scoring, although that is the currently preferred embodiment. The framework of the COLA System provides a more general means to provide evaluative functions for users. The core functions in the COLA System can be redeployed, e.g., to provide for formative assessment, mentoring, or employee/teacher/student performance evaluation.

BRIEF DESCRIPTION OF THE DRAWINGS

These and other features of the invention are further apparent from the following detailed description of the embodiments of the invention taken in conjunction with the accompanying drawings, of which:

FIG. 1 illustrates a tabular analogy of the relationships between prompts, responses, DSUs, and Cases in accordance with the COLA System of the invention.

FIG. 22 illustrates a sample case of a DSU with multiple prompts and the candidate's responses to these prompts.

DETAILED DESCRIPTION OF THE INVENTION

System Overview

The COLA System stands for Consolidated On-Line Assessment System, in short, a single system that combines all the functionality required to score essay based tests. When describing an assessment system such as the COLA System, it is necessary to describe the process from two different points of view: testing and scoring. A test taker (referred to as a candidate) sits for a test or certificate. In a familiar scenario, a high school junior sweats through the SATs, a confident consultant gains her MCSE, or a teacher gains a teaching certificate by taking the NBPTS. The candidates are presented with a series of questions or prompts to which they generate a series of responses. Sometimes this is a series of multiple choice selections, or free essay responses. In a preferred embodiment, the COLA System will be concerned with scoring the latter. The output of such a testing process becomes the input of a scoring process (scantrons are fed into readers, essays distributed to scorers, and the like).

The real difference between testing and scoring is subtle and has a dramatic impact on how prompts and responses are organized between testing and scoring. A candidate responds to prompts across a certificate, and as the pool of candidates generates responses, one could imagine the responses populating rows in a table (one row per candidate, one column per response). Though a single candidate generates each row, this does not imply that a single scorer (referred to herein as an assessor) will score the entire row. It is often more efficient to assign assessors to a prompt (or small group of prompts) and have them score down a column rather than across the rows. In the COLA System, a prompt grouping is called a Distinct Scorable Unit (DSU) that can be used to group candidate responses into COLA Cases. Assessors are assigned to a DSU and score the COLA Cases for each candidate within that DSU. FIG. 1 illustrates this analogy between prompts, responses, DSUs, and COLA Cases in accordance with the COLA system of the invention.

To understand the concept of a DSU as used herein, consider the following analogy. Three history teachers at a high school decide to give their students the same test. It has three essay questions (one page each), one on Caesar, one on Napoleon, and one on Washington. The students take the test and answer each question. Rather than each teacher grading their students' tests, they decide to split up the workload by question. They separate the pages of the tests, and one teacher grades the Caesar essays, one grades the Napoleon essays, and one grades the Washington essays. If the students were able to take the test on a computer, the teachers could use the COLA System for grading, and each student's page (which includes the question itself) would be a COLA Case, and the stack of pages associated with each question would be a DSU.

The Lifecycle of a Response

Figure 2:
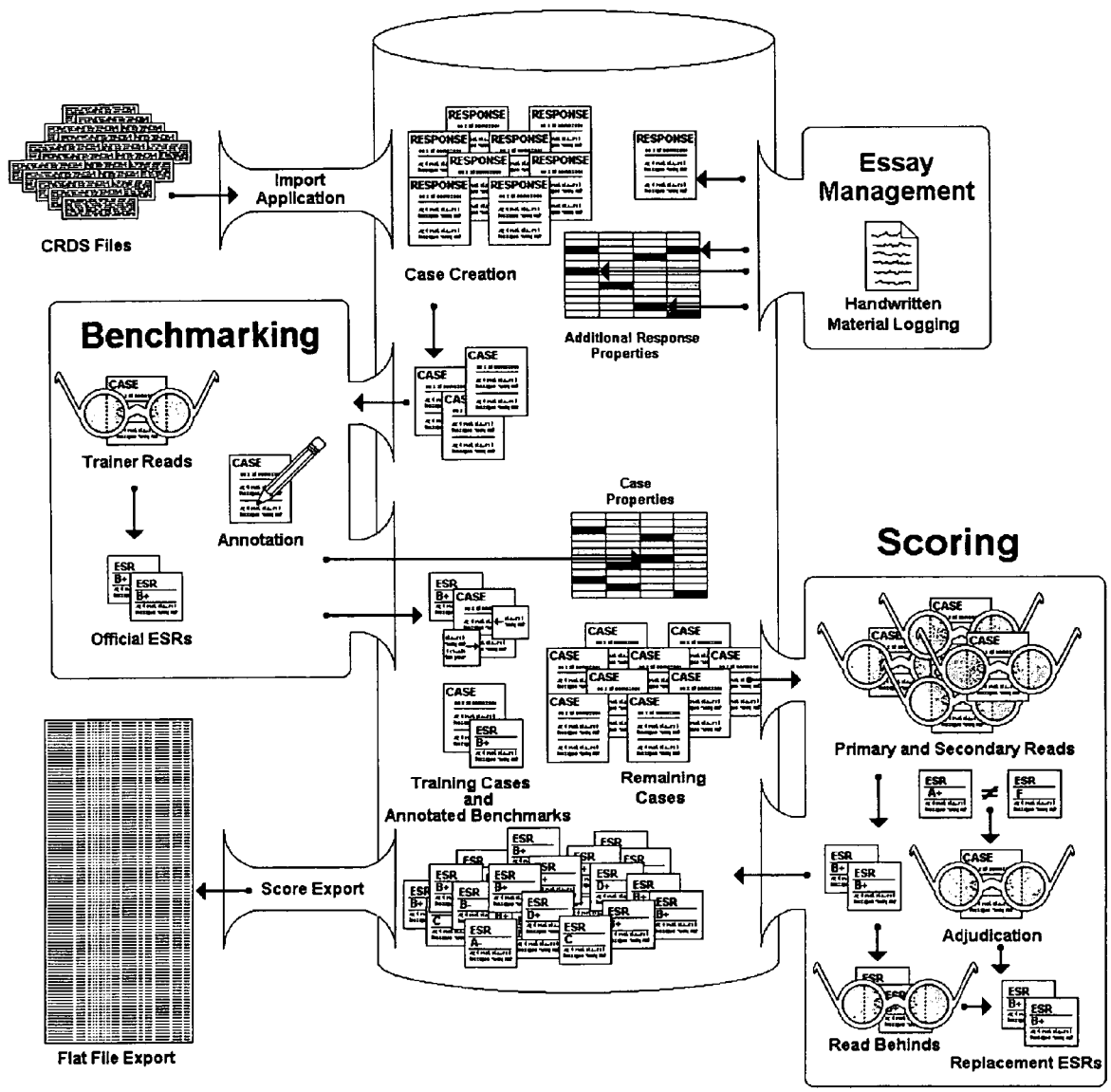
FIG. 2 illustrates a preferred embodiment of the system operation of the COLA System of the invention.

The COLA System receives raw text essays generated by candidates in response to prompts. Currently, a Central Repository Data System (CRDS) used by the present assignee delivers the responses as marked up ASCII (CRDS) files, one essay per file. The COLA System picks up the process from this point, as illustrated in FIG. 2.

Case Management (Essay Processing)

Since the CRDS does not deliver essays in a scorable state, the first responsibility of the COLA System is to process the CRDS files 202 and to prepare the essays for scoring. Case Management (also referred to as Essay management) begins with the simple parsing and importation of the response files into the database using import application 204. New response files are parsed each day and will populate the database as response records. Aside from the essay content, the response records will contain information that identifies which candidate the essay belongs to as well as which prompt the essay is in response to. The fundamental work of Essay Processing is manipulating the links within the COLA data model, especially those links establishing the content of a case. For instance, the links between responses and prompts can be manipulated at will to modify the resulting content of the cases, as dictated by business requirements. Other administrative functions manipulate the data model relationships to establish the different behaviors of the various elements (primarily the scoring model properties that dictate DSU behavior).

Many candidates elect to hand write their responses to some or all of the prompts rather than type their essays. They are given booklets at the test centers for this purpose, and even though these responses are created offline, they still must be tracked and scored online. In most cases, the COLA System of FIG. 2 will have been informed by CRDS that a candidate hand wrote their response, so the CRDS file 202 associated with the response will simply create a response record with empty essay content. The content itself remains in the booklet and must be shipped from the test centers to the essay management site. File managers process these booklets at 206. Their primary responsibility is the management and distribution of paper material. This includes receiving handwritten responses and logging them into the COLA System. When the COLA System anticipates handwritten material, the file managers simply have to indicate that the material was received and the COLA System marks the response record accordingly. However, if the candidate failed to indicate that he or she was writing the response at the test center, the act of logging in a booklet will create additional response records. Another common situation occurs when a prompt requires a diagram and explanation (typical for math or science related certificates). A candidate may draw the diagram in the booklet and type an explanation. In these cases, CRDS transfers only the typed essay portion to the COLA System, which will not anticipate the additional, handwritten material (referred to as supplementary material or SuppMats). When a file manager logs the booklet containing the supplementary material into the system, the existing record must be appended with a flag indicating that SuppMats exist for that response.

The response information is populated into the database; however, resolving inconsistent data, missing information, and duplicate records cannot be done automatically. Many data issues must be investigated through extensive reporting capabilities and resolved by administrative procedures. Cleaning up the data is the responsibility of Essay Managers using tools of the COLA System.

The final step in preparing candidate responses for scoring is Case creation 208. COLA Cases are built from the responses based on DSU definitions, and in the COLA System this will result in the creation of Case records that are indirectly linked to corresponding response records. The Case record itself will primarily be used to manage workflow, and the response records used for essay presentation purposes. In other words, the Case is the unit of work acting as a state machine, and it is indirectly related (through its DSU) to the responses that contain the scorable content for the Case. Once the Case records are established, the COLA System is ready to conduct scoring activities. Some certificates are scored offline, which require printing COLA Cases en masse to be shipped to paper-based scoring sites. File Managers will require the COLA System to not only print the material, but also generate tracking sheets and other lists to be sent with the material.

Benchmarking

The COLA System will support high stakes and large volume assessment programs. This requires many well-trained assessors to handle a large workload and ensure accurate and consistent scoring. A good way to ensure consistency between scores is to provide them with concrete examples of candidate material. These examples are called Benchmarks, which are presented to assessors as reference cases to measure other cases by at 210. In addition to Benchmarks, assessors are given training Cases to score initially. This allows trainers (experienced scorers who supervise the other assessors) to give their assessors practice and feedback before they begin scoring. Benchmark, Training and Recalibration (BTR) Cases are identified, scored, and annotated before scoring begins in Benchmarking sessions.

Benchmarkers begin their process by browsing through COLA Cases and assigning temporary scores to potential BTRs. The scores produced by this process (called Quick Sort) are not official, since official scores require justification. Benchmarkers can conduct Quick Sort activities at any time during the benchmarking process. Once a Benchmarker has read enough cases to get a general feel for the candidate responses, he or she goes back and identifies good examples for each score on the score scale (finding perfect examples of an 'A' response, 'B' response, etc.) These temporary scores are used to help the search, and when a good case is found an official score is produced. This requires writing justification, called ESR (Electronic Scoring Record) Notes, since the test scorer will be accountable for all scores generated through the COLA System. BTR Cases require Official ESRs, which are studied by assessors during the scoring sessions as examples of how to create their own ESRs.

Benchmarkers proceed to assign labels to the cases with Official ESRs. These labels identify the cases as particular Benchmarks or Training Cases. Validators, a special type of Benchmarker, confirm the labeling and Official ESRs. Benchmarkers have the option of annotating their Benchmark Cases. On paper, annotation could be done by writing in the margin, applying a post-it note, etc.; however, in the COLA System, annotations are more sophisticated. A Benchmarker will select text within the COLA Case and type an annotation, which is stored separately (the COLA System cannot legally allow the text of candidate responses to be modified). For future presentation to assessors, the annotations are displayed via drag-over text pop-ups in the client interface or as footnotes if printed to paper.

Scoring

With essay processing and benchmarking complete, the groundwork is in place for scoring to begin at 212. From an assessor's point of view, this is a straightforward process. The assessor clicks a button to receive a COLA Case, reads it, submits an ESR, and repeats. From a Case's point of view; however, scoring is not so simple. Certain cases are pre-identified to receive two scores and ESRs. These PID Cases (or PIDs) must be distributed to two assessors. If the difference between the two scores is too high, the conflicting scores must be adjudicated. Adjudications may be performed by the trainers who supervise the assessors or by any other known adjudication method. Trainers receive the Cases requiring adjudication and first score them normally. Then they are presented with the two conflicting ESRs and can edit their own ESR if need be. Once submitted, the trainer ESR will resolve the conflict, which sometimes results in canceling one of the original ESRs. Additionally, Trainers have a special function called Read Behind, which allows them to browse Cases and ESRs to follow up on the assessor's work. If they catch an ESR that they strongly disagree with, they can cancel the existing ESR and submit their own.

The paragraph above gives a brief sketch of routine scoring, but in reality it is not so straightforward. A great deal of effort is required to support the scoring process. The COLA System aids these efforts including training, distribution and retrieval of handwritten materials, and troubleshooting exceptions for individual cases. This requires extensive reporting and administrative functionality. The COLA System also includes automated message routing between the central administrative site and the remote scoring sites.

Once the ESRs are generated, a score exporting routine 214 exports the scores as a flat file 216. File 216 is used by reporting software to generate appropriate score reports.

Detailed System Description

Hardware

Figure 3:
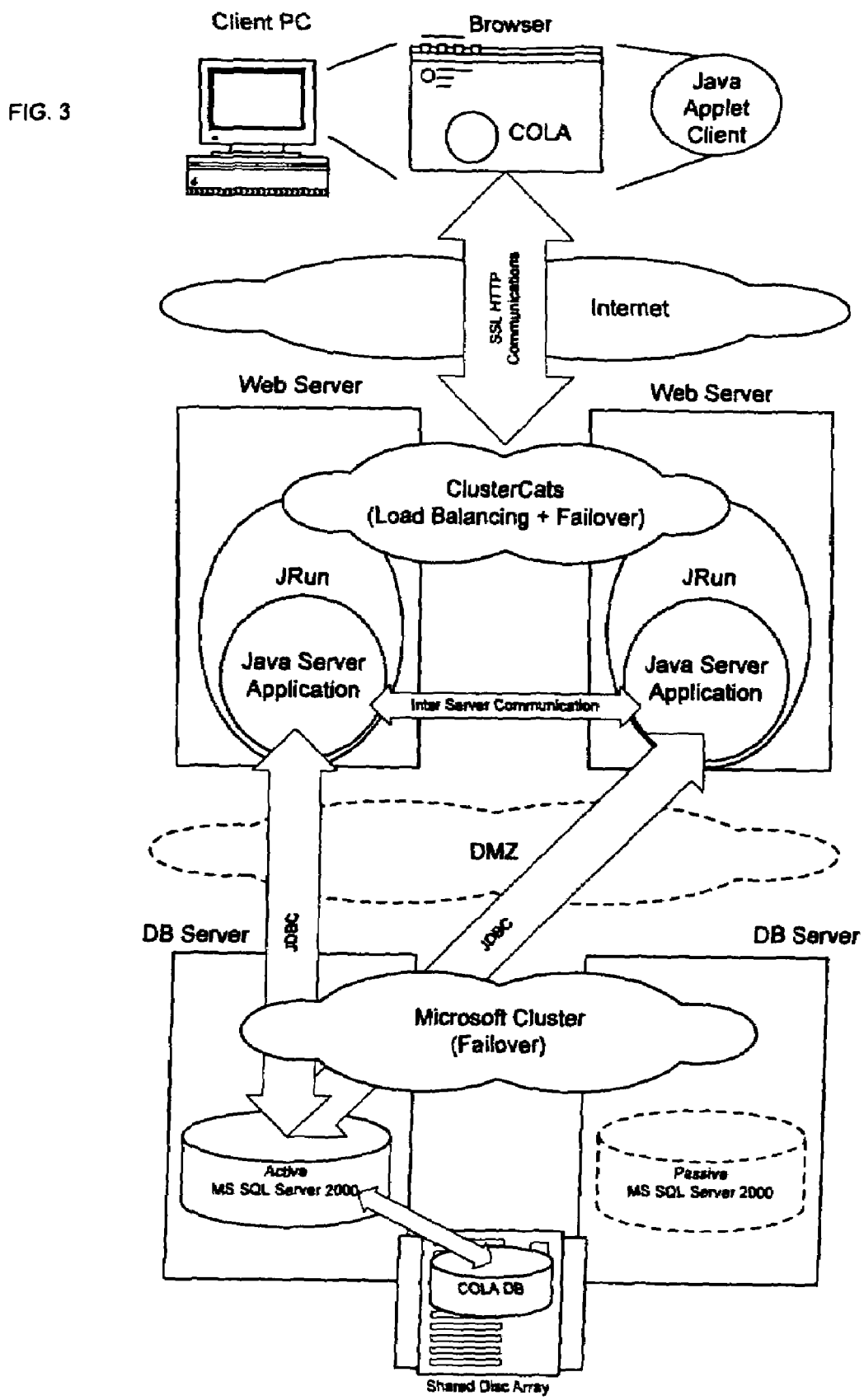
FIG. 3 illustrates a preferred embodiment of the hardware configuration of the COLA System of the invention.

FIG. 3 illustrates the hardware configuration of the COLA system. As illustrated, a client PC 302 of a user of the COLA System (e.g., a human scorer) includes browser software (Java Applet) 304 that pulls up the COLA client interface 306 and via an SSL HTTP communications channel 308 communicates over the Internet with one or more web servers 310 including a Java server application 312 including the COLA System application of the invention. The Java server application 312, in turn, communicates with one or more back-end database servers 314 through a firewall 316. The database servers 314 include conventional database server software 318, such as Microsoft's SQL Server 2000, to access the COLA database 320, which may reside on, for example, a shared disc array. Such hardware arrangements are well known to those skilled in the art and will not be elaborated upon here.

Software

The COLA client interface 306 comprises HTML pages and the COLA Client Applet 304. The COLA Client Applet 304 is a blank applet frame capable of visualizing, maintaining and manipulating client components and handling and dispatching events between them. The Applet 304 receives XML documents specifying the client user interface screen that needs to be presented to the user, defining all the visual and non-visual components, their initial properties and placement on the screen. Applet 304 will also define some events that are general for this client screen (for example "Submit Score" for the Assessor case scoring screen). The Applet 304 will load and present all the necessary client components. The request sending mechanism requires combining information from all of the client components. Accordingly, there is a mechanism (provided by the COLA Client Interface) for collecting of all the request properties/parameters from the components.

COLA Software/Data Model

Java Server Application 312 illustrated in FIG. 3 on each web server 310 contains server software for implementing the COLA data model. As noted above, the key to the preferred embodiment of the COLA System of the invention is the notion that there is some sort of entity that is scored. How to score this entity has been treated as a set of business rules that become implemented in the code base of precursor systems. Instead of establishing business rules as the set of behaviors (functionality) for the scorable entities, the COLA System injects this concept into the data model itself. This includes the establishment of a data abstraction called the Scoring Model.

Figure 4:
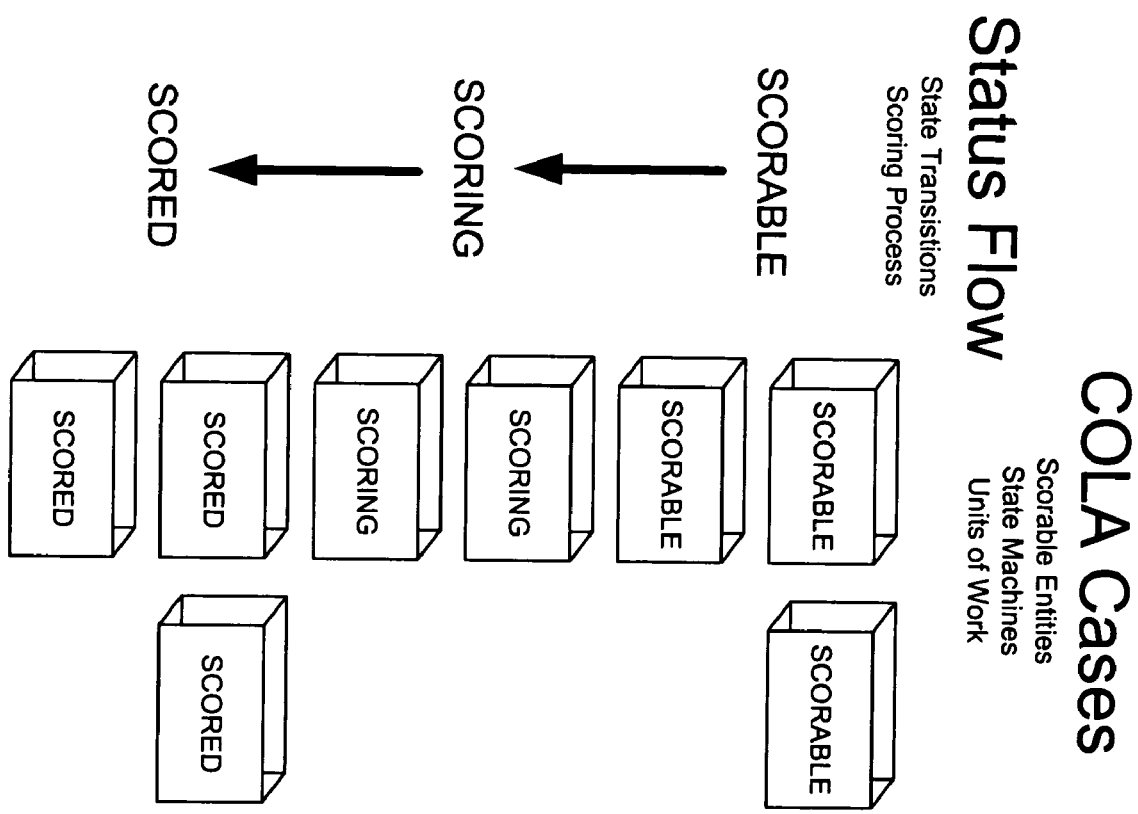
FIG. 4 illustrates an example of state transitions in a simple scoring process of the COLA System of the invention.

Because the scorable entity is distributed to assessors according to the scoring model at play, there must be a way to maintain its state. State information is included in the data model for the scorable entity, and therefore, the entity can be thought of as a state machine. As shown in FIG. 4, a simple example would be scorable entities going from a state called 'SCORABLE' to 'SCORING' once an assessor received the case. After submitting the score, the entity may transition to 'SCORED.'

The COLA Case concept is the scorable, state machine entity for the COLA System. The COLA Case also acts as the object that is scored (as opposed to only maintaining state information of some other object, which would be distributed and scored). This combination of dual purpose (state machine+scorable unit of work) into one entity is nonrestrictive, since the object to be scored and the maintenance of its state have a singular relationship.

Figure 5:
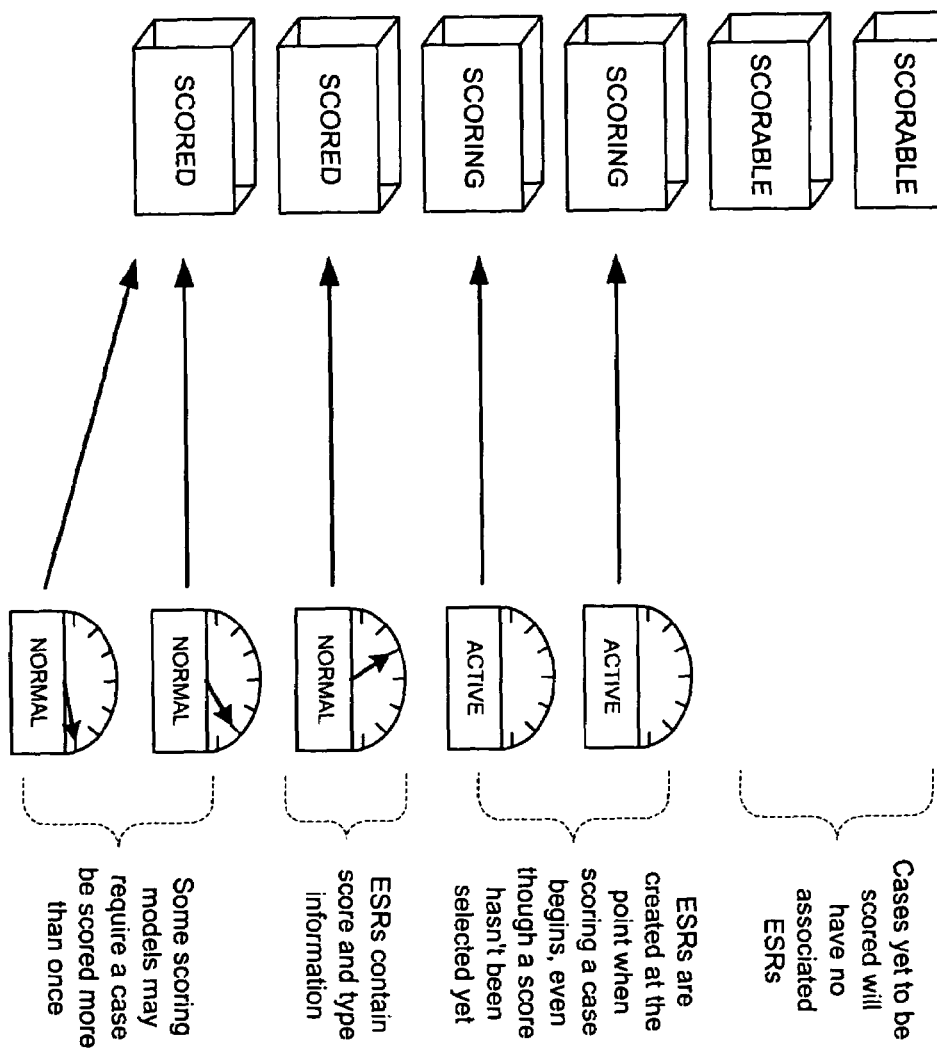
FIG. 5 illustrates the relationship between a COLA Case and the Electronic Scoring Records (ESRs) generated by the assessors.

FIG. 5 illustrates the relationship between a COLA Case and the Electronic Scoring Records (ESRs). As illustrated in FIG. 5, when scoring a COLA Case begins, ESRs are created even though a score has not been selected yet. The ESRs for scored COLA Cases contain score and type information and, as shown, may be scored more than once for some scoring models.

Figure 6:
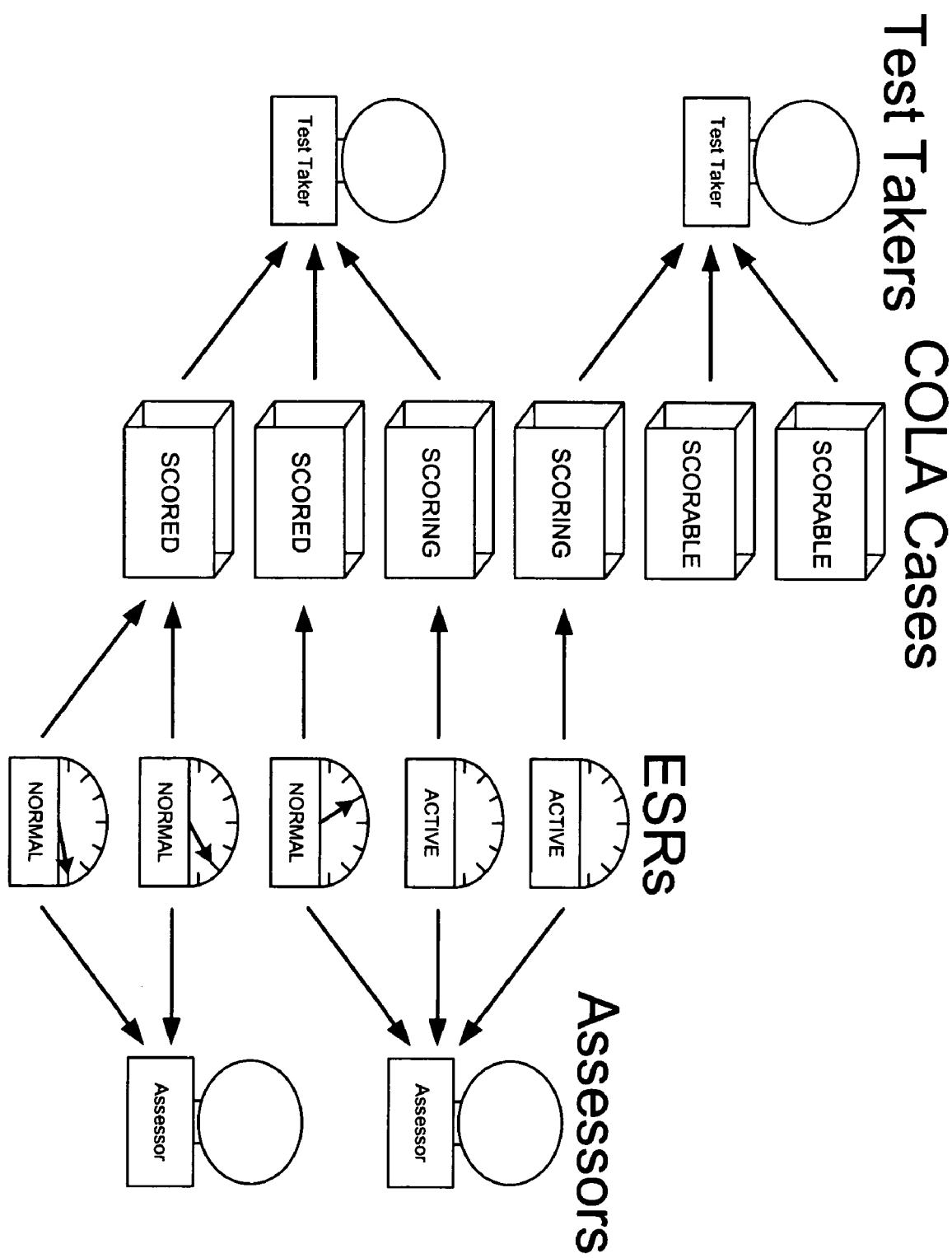
FIG. 6 expands upon FIG. 5 to illustrate the linking of the test takers (User Account) and the assessors to the COLA Cases and ESRs.

Those skilled in the art will appreciate that it is not sufficient to distinguish scorable entities by state alone. At the very least, ownership must be established, or else it would be impossible to send the scoring results to the test takers. Therefore, a COLA Case identifies not only its state, but also identifies and is therefore related to the test taker to which the COLA Case belongs. Ownership must also be identified for the scores themselves so that it is known who provided the score. FIG. 6 expands upon FIG. 5 to illustrate the linking of the test takers (User Account) and the assessors to the COLA Cases and ESRs. In this fashion, the system can track the test takers and their responses as well as the activities of the assessors.

Figure 7:
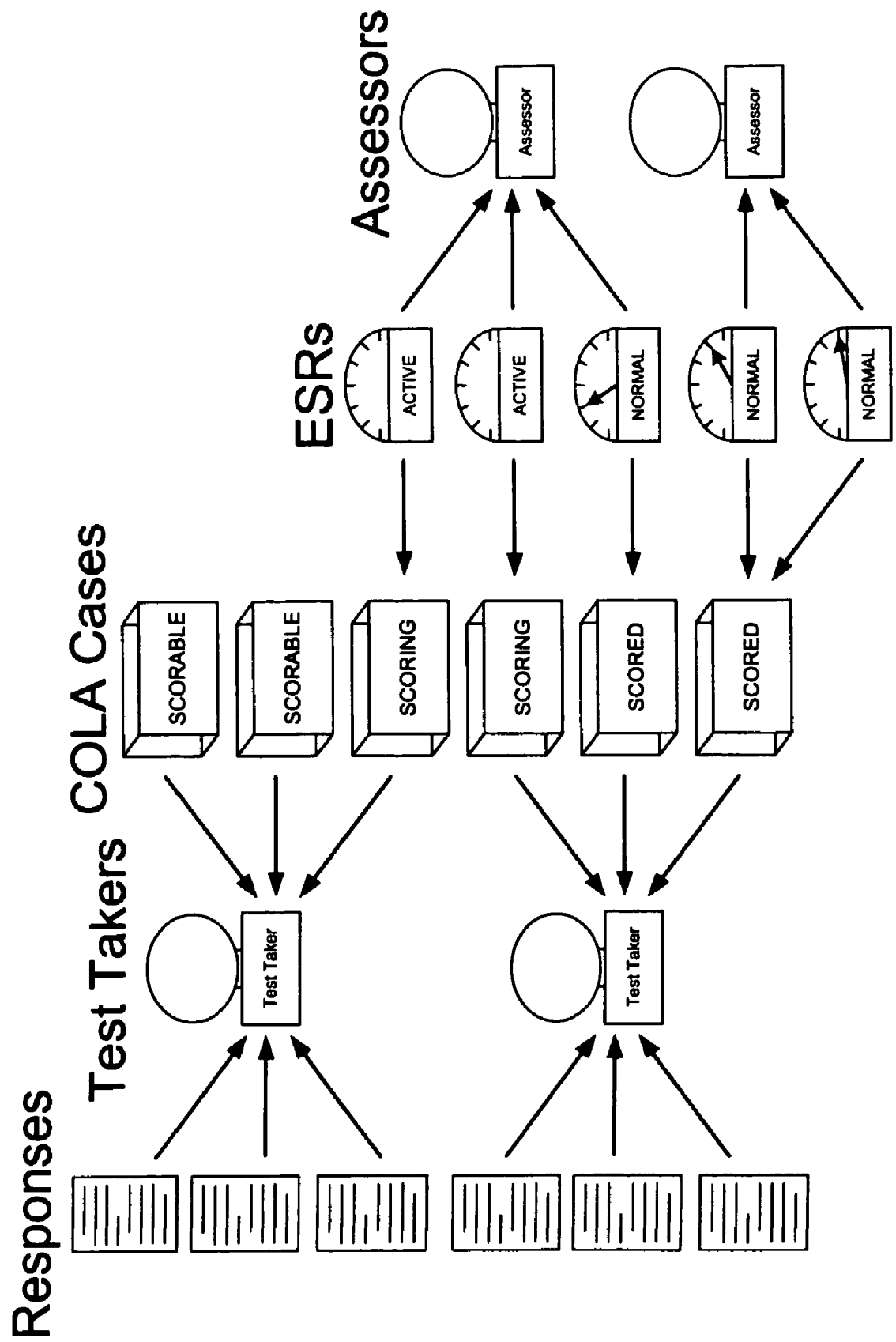
FIG. 7 illustrates the Responses stored separately in a Response table and the relationship of the Responses to the test takers.

For a test taker to be evaluated, some form of scorable material must be submitted. In the COLA System, this material is referred to as Responses, and stored in its own table. This is one of the major liberating breakthroughs for flexibility and applicability of the COLA System, for COLA Cases do not directly contain the scorable content. In other words, though an assessor receives and works with a COLA Case, this unit of work itself does not contain the scorable material. It is stored separately in a Response table, which, like the COLA Cases, must at the least identify ownership (in other words, who submitted the content stored in any given row in that table). FIG. 7 illustrates the Responses stored separately in a Response table and the relationship of the Responses to the test takers.

Figure 8:
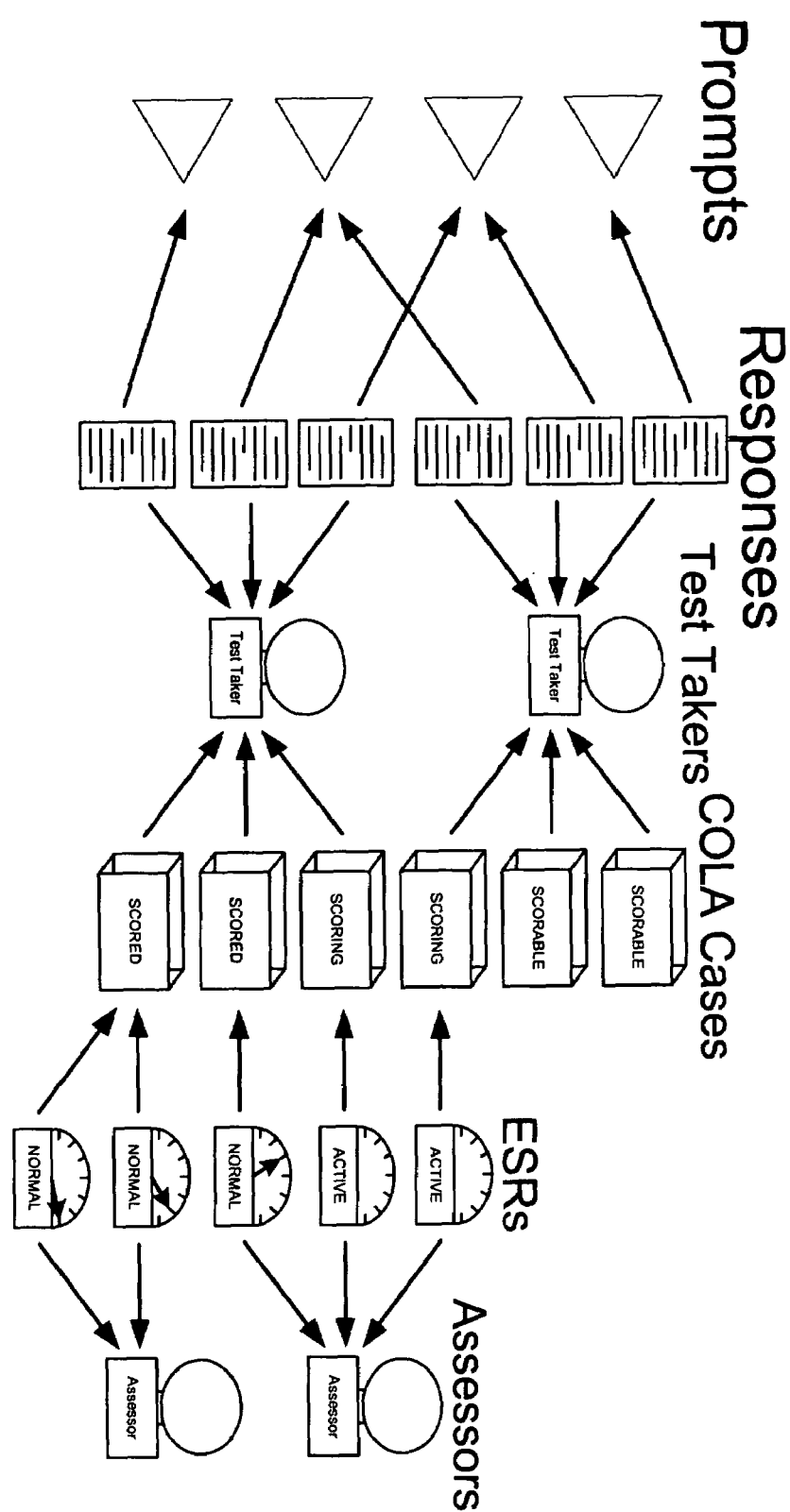
FIG. 8 illustrates how the responses are distinguished by ownership and Prompts.

Most forms of assessment are not wholly free form, where a test taker just submits a body of material to be scored. If this were the case, test takers would submit one giant response and have that material stored in a single record. No other form of distinguishing the responses from each other would be required. In reality, tests are designed to elicit a specific set of responses from a test taker. Test developers create sets of Prompts (also called items) for use in Constructed Response tests, which are delivered to test takers. Test takers create Responses 'in response' to the Prompts they receive. Therefore, a single test taker will have multiple responses, and in the ideal case, one for each Prompt they received. The COLA System has built-in functionality to deal with the "non-ideal" circumstances such as instances where the test taker skips prompts, submits a response for one prompt to the wrong prompt, or submits multiple responses for the same prompt. Thus, as shown in FIG. 8, responses must be distinguished by ownership and the corresponding Prompt.

Test takers do not respond to every Prompt in the system, simply a subset. Organizing the Prompts into these subsets is required, and the COLA System uses a free form hierarchy (tree) to do so. In the COLA System, this hierarchy is called the DSU Tree and is used to organize and distinguish the COLA Cases.

Figure 9:
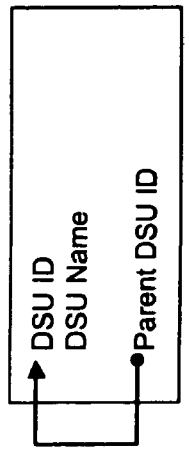
FIG. 9 illustrates how rows in a simple, self-referential table can relate to one another to create a tree-based DSU construct in accordance with the invention.
Figure 9:
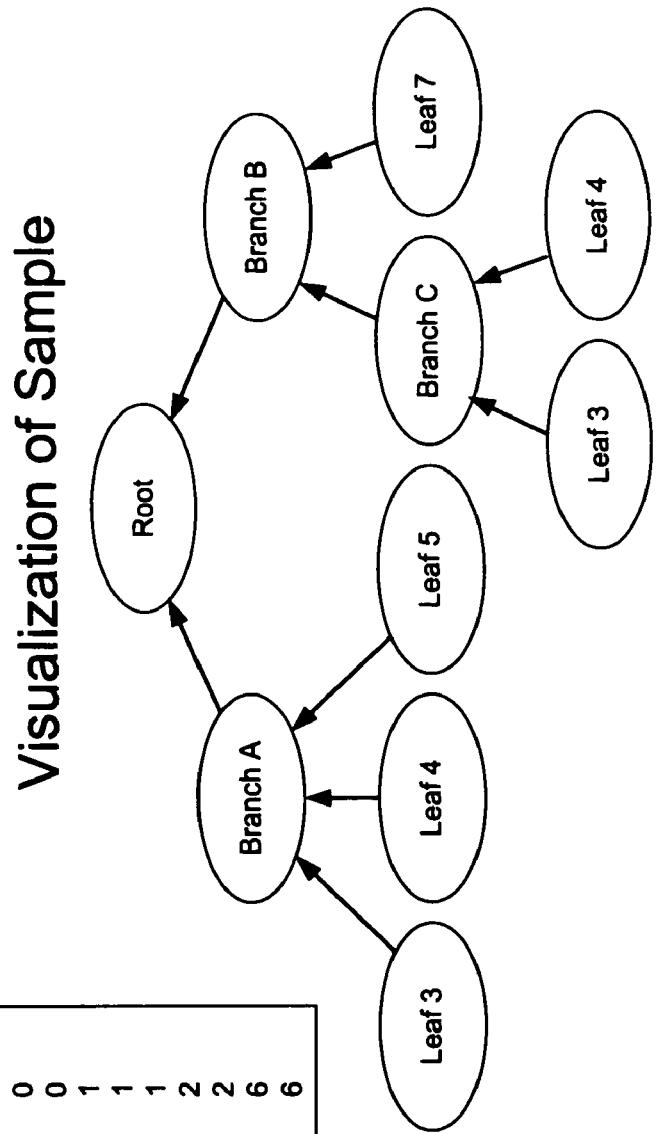

Because the COLA System is a scoring system (as opposed to a test delivery and response capture system), it is not important to organize the Prompts in the way that they are delivered to candidates. Instead, the Prompts are preferably organized by how they will be scored. The DSU structure is a tree since it is possible to categorize Prompts at several levels. The lowest level of distinction required from the DSU Tree is grouping items by how they will be scored. To allow records from other tables to freely associate themselves to any level within the DSU Tree hierarchy, the entire tree is preferably stored in a single, self-referential table. FIG. 9 illustrates how rows in a simple, self-referential table can relate to one another to create any tree-based construct in accordance with the invention.

The DSU row elements are indiscriminately referred to herein as 'nodes' (a tree is a set of unidirectional, hierarchical nodes), where each node relates to another node, called its 'parent.' A 'parent' node can have any number of nodes that claim it as their 'parent', and these nodes are referred to as 'children.' A node with no 'parent' is said to be the 'root' of the tree (all lineages must eventually collapse to a 'root' node). A node with no 'children' falls into a special set of nodes, usually called 'leaf' nodes. For the DSU Tree, 'leaf' nodes signify that no further distinction between related elements is required. A node with a 'parent' and 'children' is called a 'branch.' The 'lineage' or 'ancestry' of a node refers to its 'parent', its parent's 'parent', and on and on up to and including the 'root.' The set of nodes with the same 'parent' are called 'siblings.'

The DSU Tree structure of the invention supports two important concepts: inheritance and membership. A 'child' node inherits information from its 'parent'. For example, suppose that a DSU for a history test is called 'HISTORY', and it has two 'children' nodes, one called 'WWI' and one called 'WWII.' This indicates that this history test is made up of a set of questions on World War I and another set of questions on World War II. Further suppose that the test is essay based, such that each section has several Prompts to which the test takers must respond. This test has a special scoring model requirement that every essay must be assessed twice. Within the data model, this information need only be configured for the 'HISTORY' DSU node, because the fact that 'HISTORY' is double scored implies that 'WWI' question and 'WWII' questions are also double scored based on inheritance. The same example can be used for illustrating the membership concept. Suppose there is a need to identify all the questions of the 'HISTORY' test, but the set of questions are associated with 'WWI' and 'WWII.' Because of membership, the 'HISTORY' DSU automatically contains the questions associated with its 'children' nodes.

Figure 10:
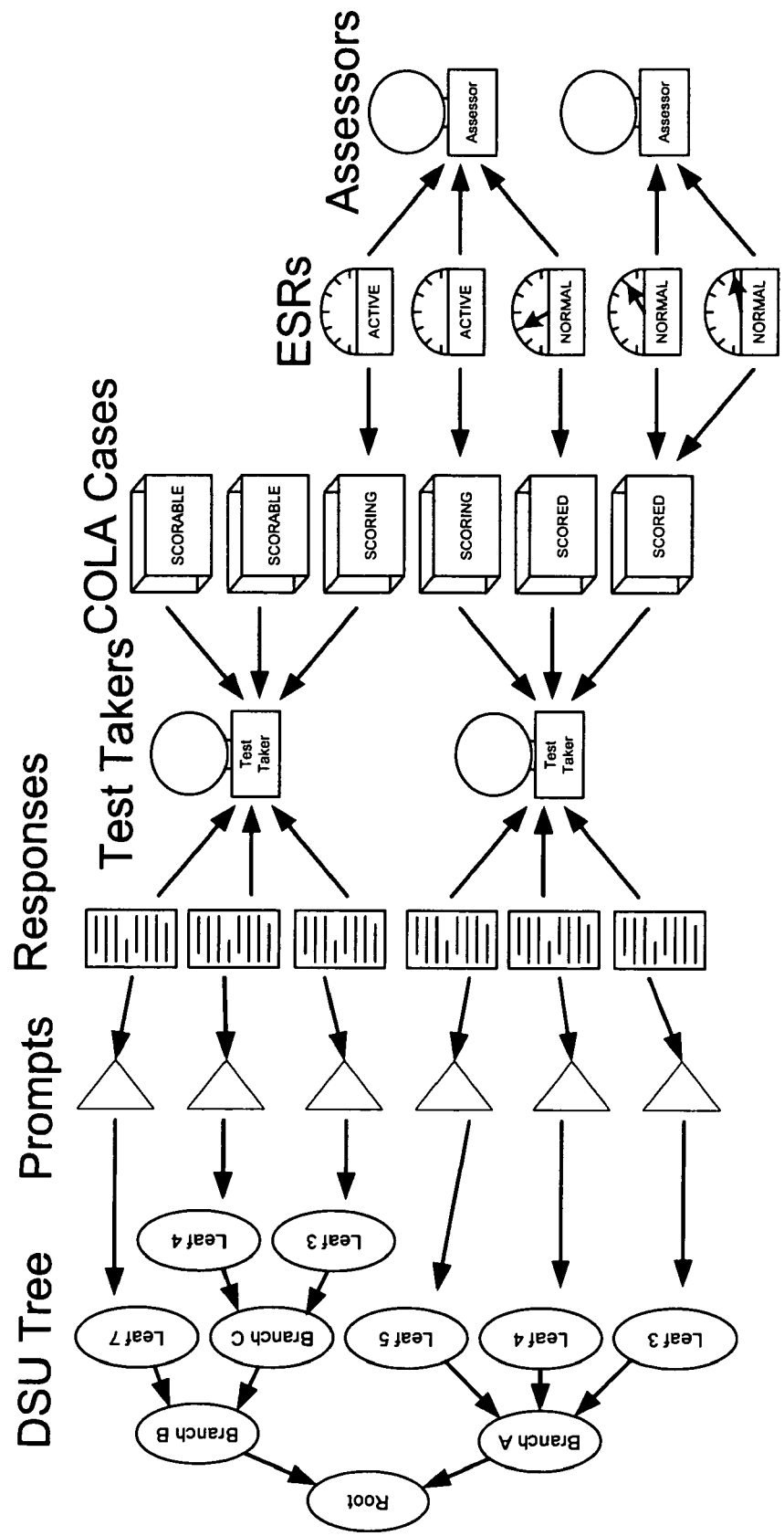
FIG. 10 illustrates the relationship between the DSU Tree for the test and its correlations with the Prompts.

The above example required an association between questions (Prompts) and their DSUs. To organize the Prompts with the DSU tree, every Prompt is related to at least one DSU node. In the presently preferred embodiment of the invention, Prompts are related directly to a single DSU node. However, this is a restriction of the implementation itself, not the data model in general, and the COLA System may be adapted to allow Prompts to relate to multiple DSUs. FIG. 10 illustrates the relationship between the DSU Tree for the test and its correlations with the Prompts and COLA Cases.

Figure 11:
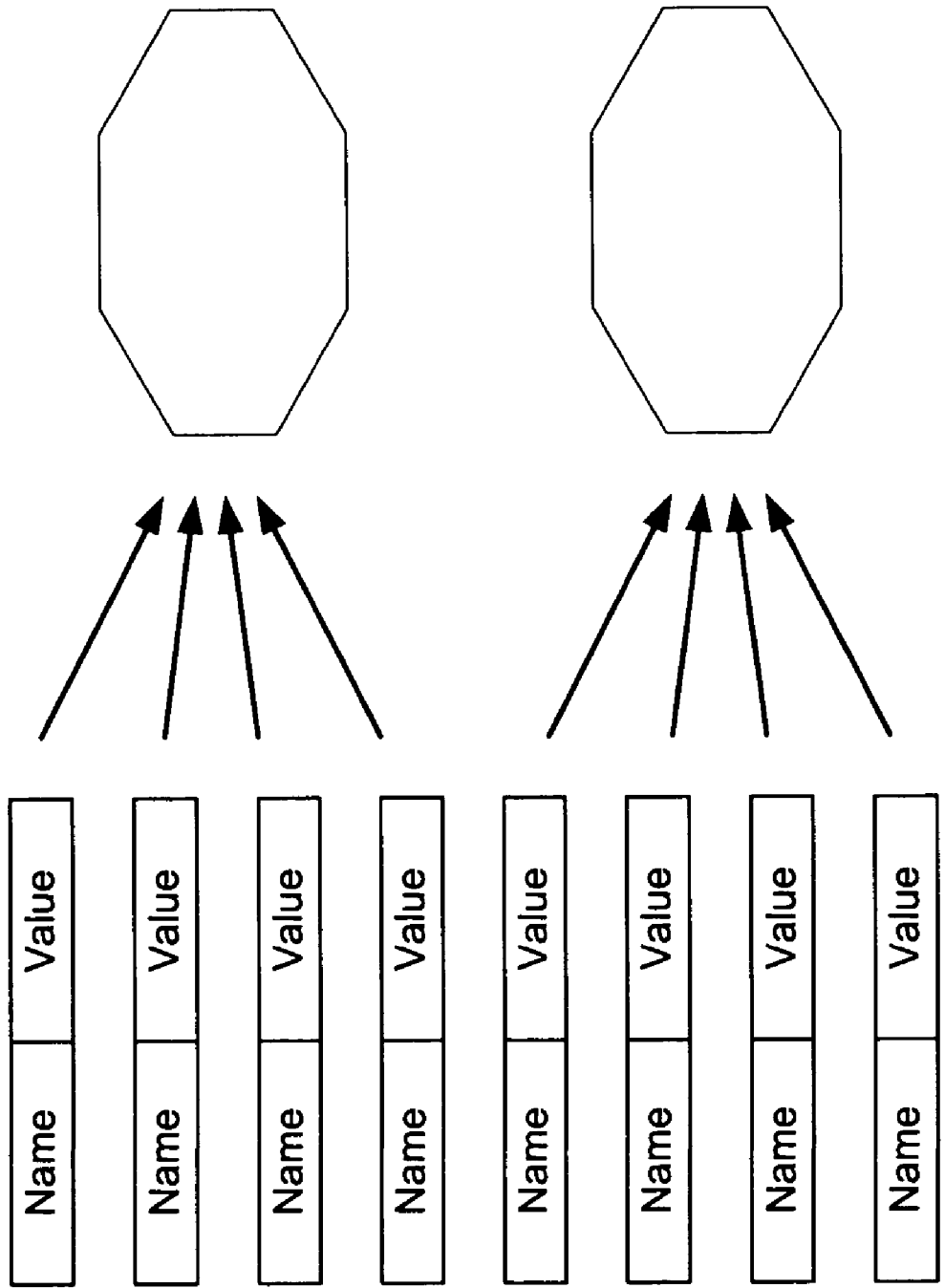
FIG. 11 illustrates the relationship between a Scoring Model and its Properties stored in a table.

DSUs are used herein only as an organizing principle, and are required to group things by how they are scored. The scoring model abstraction describes ways of scoring things (namely, COLA Cases). Many rules and parameters make up a scoring model, so the data abstraction must be able to capture both. The approach in the COLA System is to write the code separately for each rule, and to keep all the parameters outside of the code base. The scoring model data abstraction must provide this information, in the form of identifying which rules should be applied, and what values to use as the parameters. All of this information in general is referred to as Scoring Model Properties, and stored in two simple tables. As shown in FIG. 11, one table identifies a Scoring Model, and the other contains the Properties for each scoring model. Since the Properties table contains all properties used by all Scoring Models, the individual rows must identify the Scoring Model to which they belong.

Figure 12:
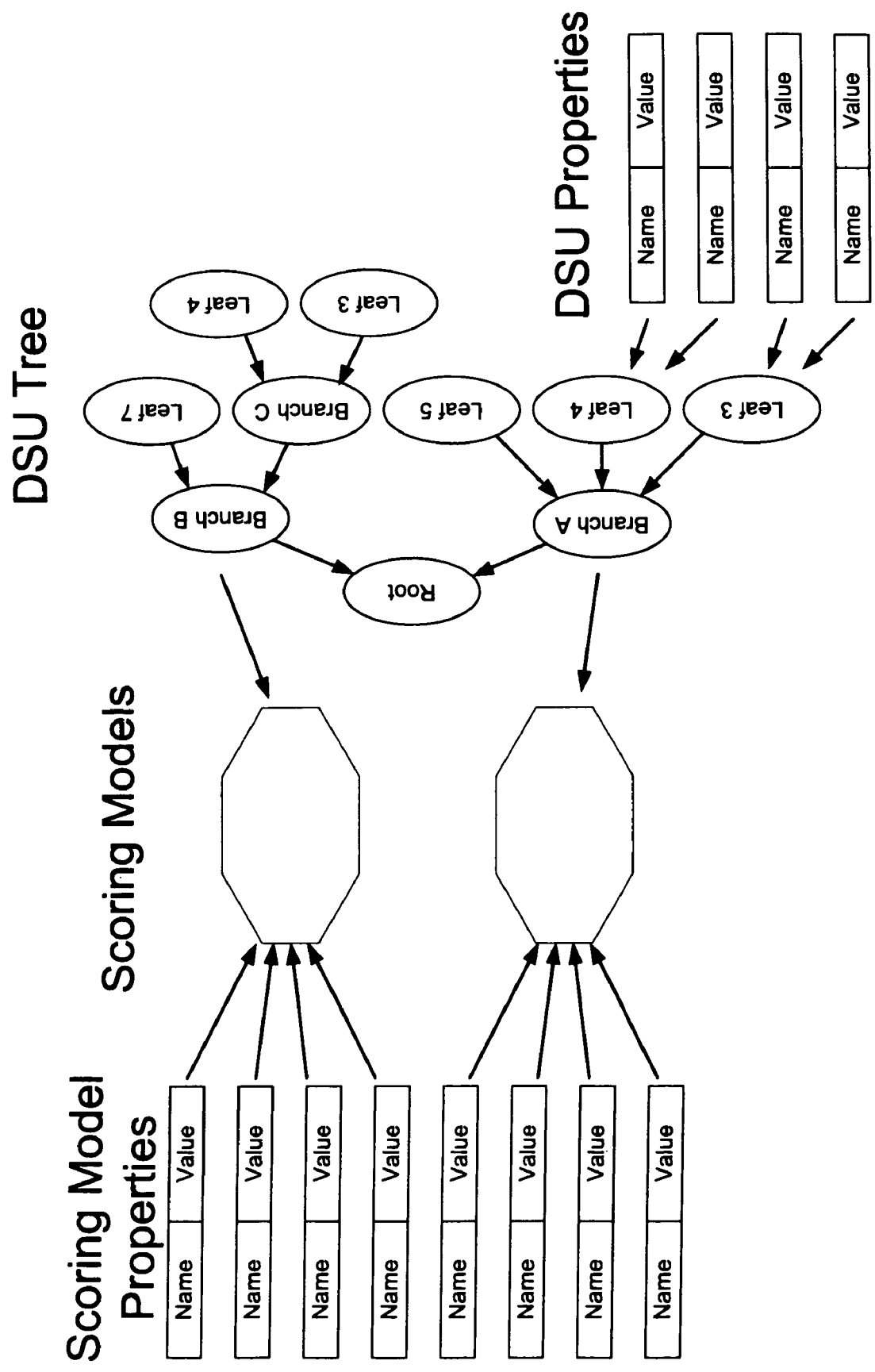
FIG. 12 illustrates the Scoring Model Properties associated with a Double Scoring Model used for a new program's DSUs, where the top level DSU is associated with the new Double Scoring Model.

A simplified example of a Scoring Model Property and how it dictates behavior will illustrate this concept. Suppose a testing program requests that everything be double scored. In other words, all responses are reviewed by two separate assessors and receive two scores instead of one (assume that the scores are averaged for the final score). A tiny bit of extra functionality is coded, so that instead of the process flowing as SCORABLE->SCORING->SCORED, it flows as SCORABLE->SCORING->WAITING->SCORING->SCORED. The new state machine does not go directly into SCORED after SCORING in all instances. It will go into a WAITING status until another assessor receives it (SCORING) has submitted the second score (when it finally reaches SCORED). So the new code checks the number of scores when 'exiting' the SCORING state, sometimes going to WAITING (if there are not enough scores yet), and other times to SCORED (if it is the final score required). The Scoring Model Property would look like: Name: "ScoresRequired"=Value:2 (i.e. there are 2 Scores Required). As shown in FIG. 12, the Scoring Model Property is associated with a Double Scoring Model used for the new program's DSUs, and their top level DSU is associated with the new Double Scoring Model.

Because DSUs organize things by how they are scored, and Scoring Models describe ways to score things, DSUs relate to Scoring Models. A nicety of the DSU Tree is that because of inheritance, not all DSUs have to relate to a Scoring Model, since they can inherit the appropriate information from their 'ancestors.' For all of the Properties associated with how a DSU will be scored, some are specific to only that DSU, some shared with several of its 'siblings', and some apply to entire 'branches' of DSUs. The DSU Tree allows these Properties to be associated at any level, and so a good strategy (though not enforced by the data model), is to group the broadly shared Properties into a Scoring Model, and apply specific Properties to the DSU itself. The data model allows a DSU to associate itself with a Scoring Model, and attach specific Properties anywhere on the DSU Tree.

A DSU Property works exactly like a Scoring Model Property. Returning to the previous example of the new Double Scoring Model, suppose the program requested that all of their material receive two scores, except a special section in the test that needed three scores. A DSU Property just for that section would be created as: Name: "ScoresRequired"=Value:3, and the triple score behavior would override that single property which used to apply to every DSU of the program. Note also that in this case, the same code described above applies to both variations. A consistent implementation strategy like this one allows program to mix and match a whole series of parameters to create the exact behavior for how they want their material scored.

Inheritance also allows for overriding information at a lower level in the tree. This means that if a 'branch' of DSUs are scored exactly the same way, but one node has a special exception, the entire base of Properties can be applied to the entire 'branch.' To allow for the special case DSU, that Property can be overridden by associating the special information to only that DSU.

For the purposes of simplifying the diagrams and discussion below, it will be assumed for the time being that Prompts are related to a single, 'leaf' DSU, and that each DSU 'leaf' has only one related Prompt. In other words, one Prompt is provided per DSU, and no 'children' of those DSUs are provided. The data model allows for more complex relationships, some of which will be explored in a later section below.

Figure 13:
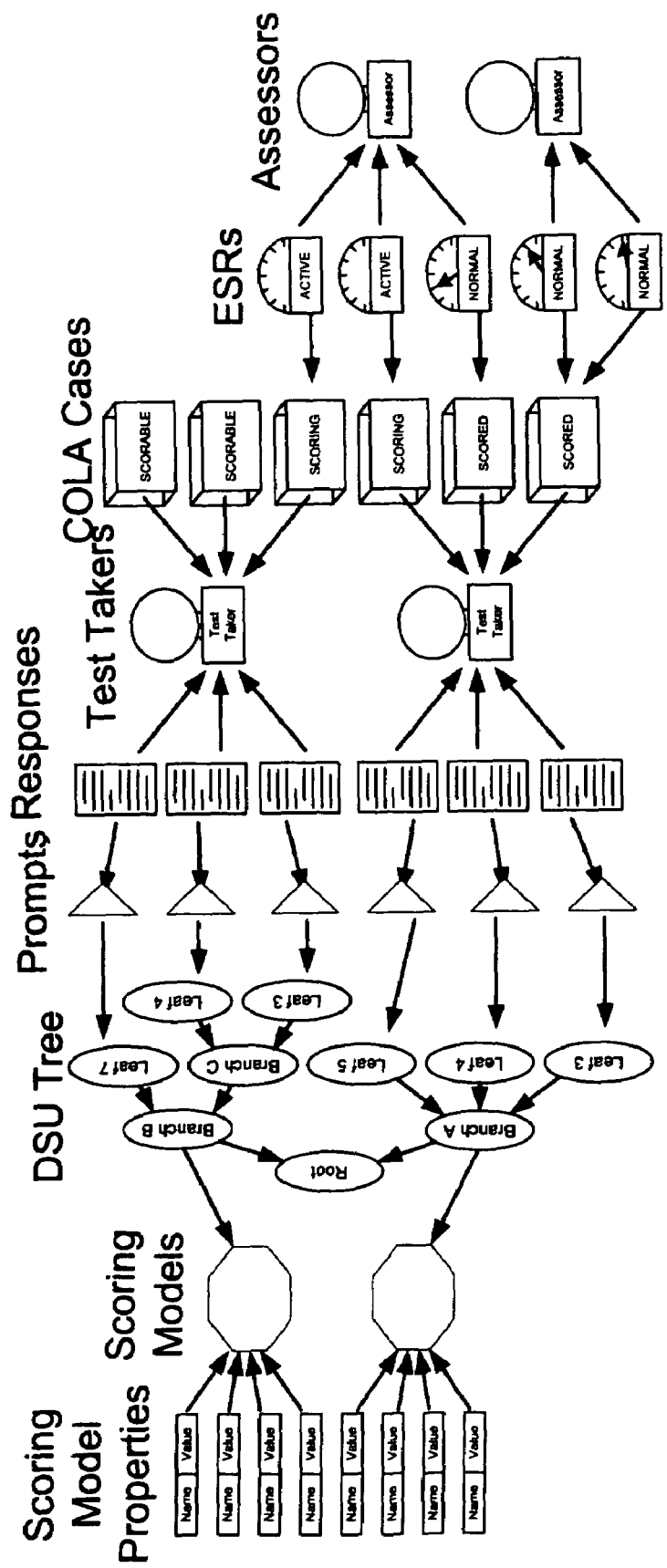
FIG. 13 illustrates all of the relationships in the COLA System, including the Scoring Model, the DSU Tree, the COLA Cases and the ESRs.
Figure 14:
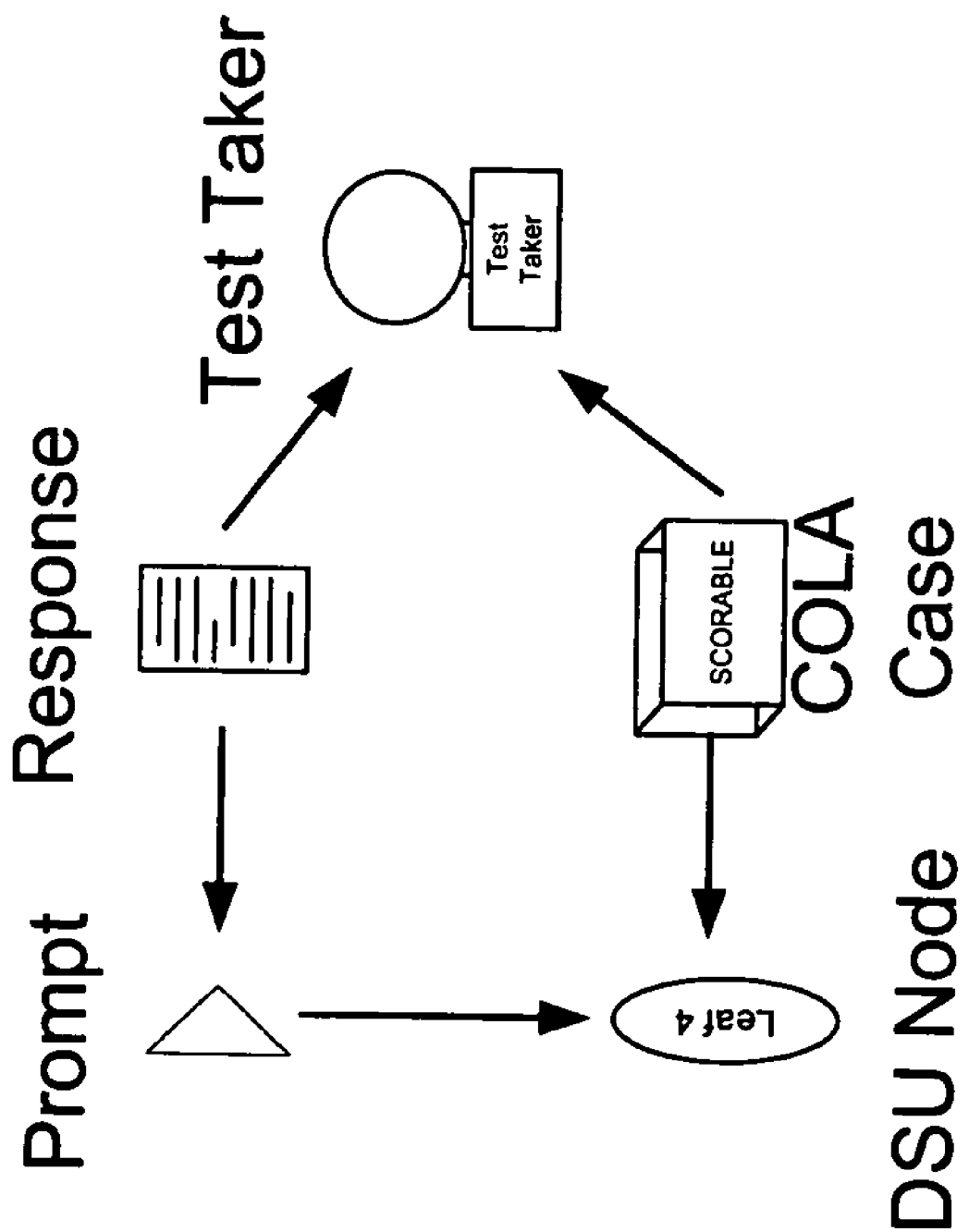
FIG. 14 illustrates the relationships linking the COLA Case to the DSU node.

All but one final major relationship of this data model has been described. A diagram of the relationships described so far (FIG. 13) reveals this oversight. The question raised by FIG. 13 is: 'How does an assessor write the ESR for a COLA Case, when not only do they need to see the correct Responses, but the system also needs to know the Scoring Model in order for the COLA Case to be scored correctly?' Because a COLA Case is the scorable entity, and the DSU describes how things are scored, a COLA Case must be related to a DSU to indicate how it is scored. Additionally, because the Prompts are related to the DSU, the COLA Case is also related to its content. Since both COLA Cases and the Responses indicate ownership (the test taker), and the DSU connects COLA Cases to the Prompts, content is associated with COLA Cases. FIG. 14 (simplified by only including one DSU with one Prompt) illustrates this relationship linking the COLA Case to the DSU node.

Those skilled in the art will appreciate that the Scoring Model and Properties abstractions of the data model of the invention allow for massive flexibility. For example, an ESR created by an assessor in accordance with the invention may include, in addition to or in place of a conventional alphanumerical score, written commentary or text to justify the score given as well as feedback to the use. The ESR may also include other customizable scoring data such as slide bars or other graphics. This data may be input by the assessor through a portion of the scoring screen or through a special pop-up window.

Also, because the COLA Case concept is related through the DSU Tree to its content (as opposed to including the content in the COLA Case, or combining the state machine and unit of work concepts with the Responses themselves), flexibility is further available as it pertains to COLA Case construction (building the content of the COLA Case). Several major varieties, called Types, are possible and now will be described.

Type I and Type II Scoring

Not all prompts are created equal. Some exercises are designed for their prompts to be scored together (Type I), while it is more efficient for some exercises for their prompts to be scored separately (Type II). In this case, the lowest level of distinction required from the DSU Tree is grouping the items by how they will be scored.

Figure 15:
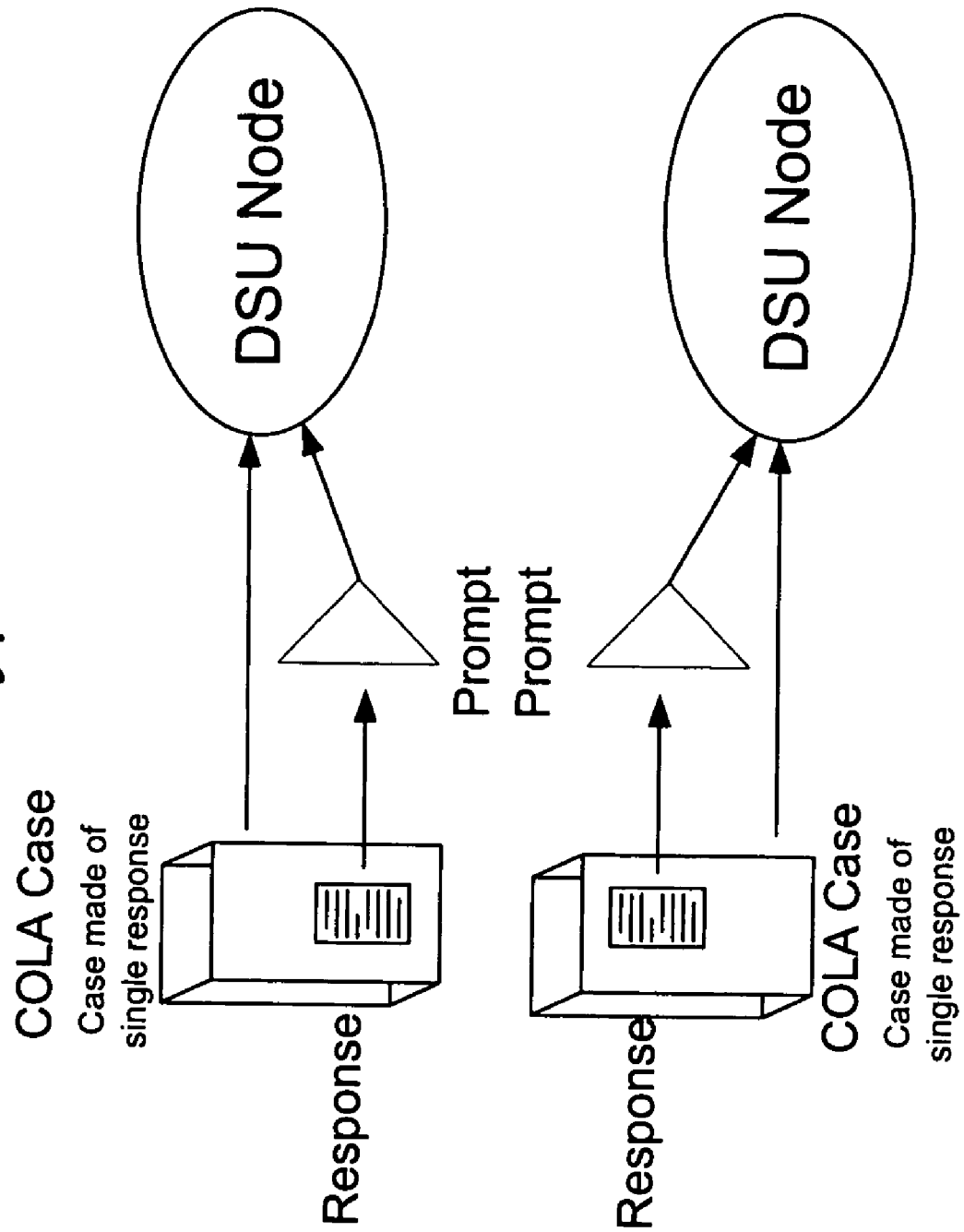
FIG. 15 illustrates a Type II prompt having its own DSU leaf node made up of a single essay that is received by assessors via one case at a time.

Type II scoring, where every essay to each prompt is scored separately, requires the DSU tree to distinguish between these prompts. Therefore, as shown in FIG. 15, each Type II prompt has its own DSU leaf node. Cases in these DSUs are made up of a single essay, and assessors receive them one at a time. When a Type II unit of work (Case) is sent out for scoring, the Case indicates a DSU with one Prompt, and so the system delivers the essay where the Response Prompt ID equals that Case's DSU's Prompt's ID and the Response Candidate User Account ID equals the Cases Candidate User Account ID (i.e., one Case to one Essay (Response)).

Figure 16:
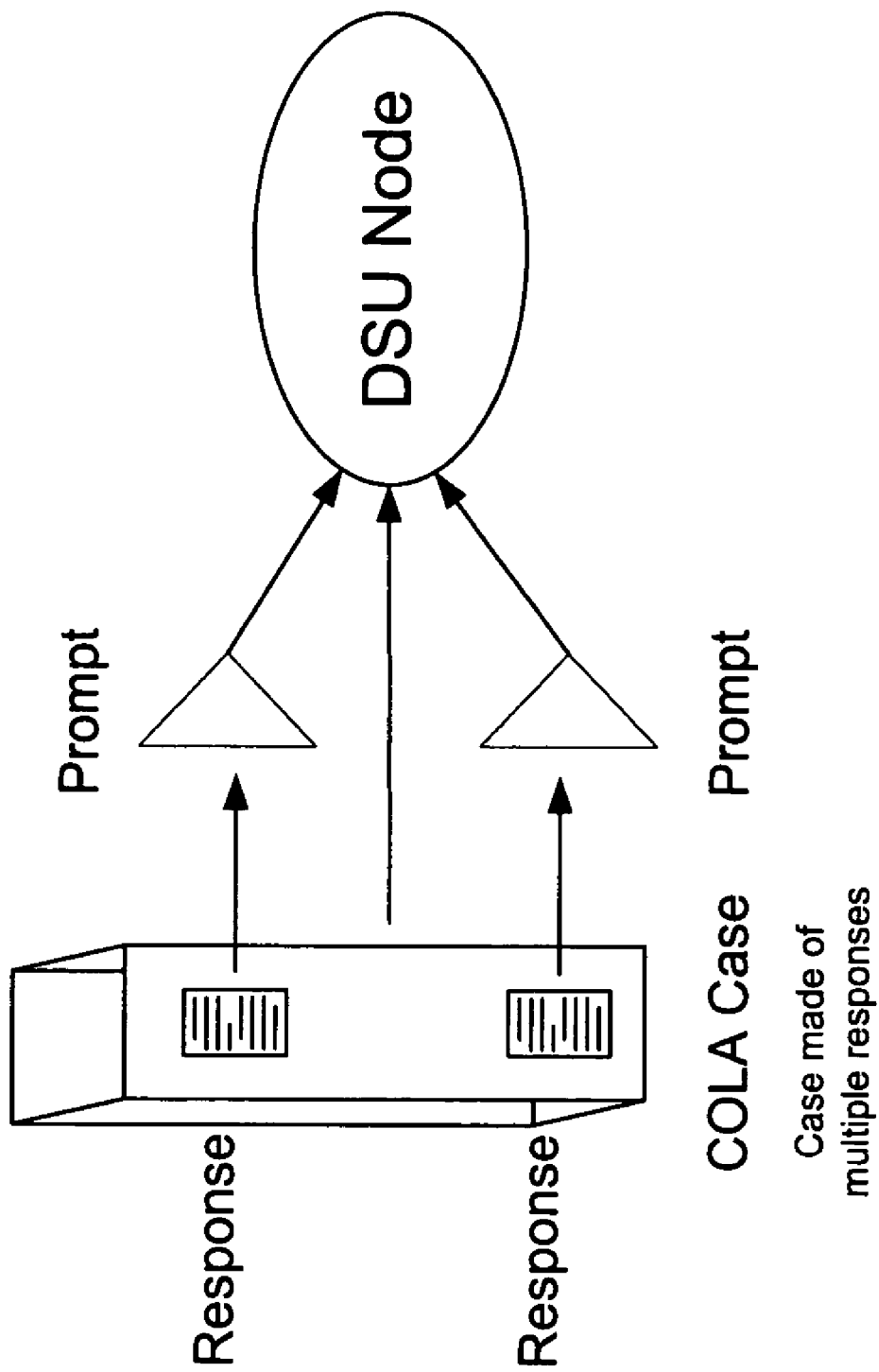
FIG. 16 illustrates Type I prompts that relate to a single DSU leaf node made up of multiple essays that are scored together via a single case by the assessors.

On the other hand, Type I scoring, where essays are scored together, requires the leaf node of the DSU tree to include all the Prompts that are scored together. Therefore, as shown in FIG. 16, many Type I Prompts relate to a single DSU leaf node. Cases in these DSUs are made up of multiple essays, and assessors score them all together. When a Type I unit of work (Case) is sent out for scoring, the case indicates a DSU with multiple Prompts, and so the system has to loop through the process described above. Another key field on the Prompt table is Prompt_SeqNum, which basically establishes the order of the Prompts that share a DSU. This is like a question with multiple parts: Part A, Part B, Part C, etc., and the resulting COLA Case has many Essays (Responses).

EXAMPLES

Type I:
"All men are created equal"
Part A: Discuss the origin of this ideal
Part B: Discuss the problems of applying this ideal to constitutional governments
Type II:
Describe the process of photosynthesis.
Describe the process of natural selection.

Type IA and Type IIA Scoring

Figure 17:
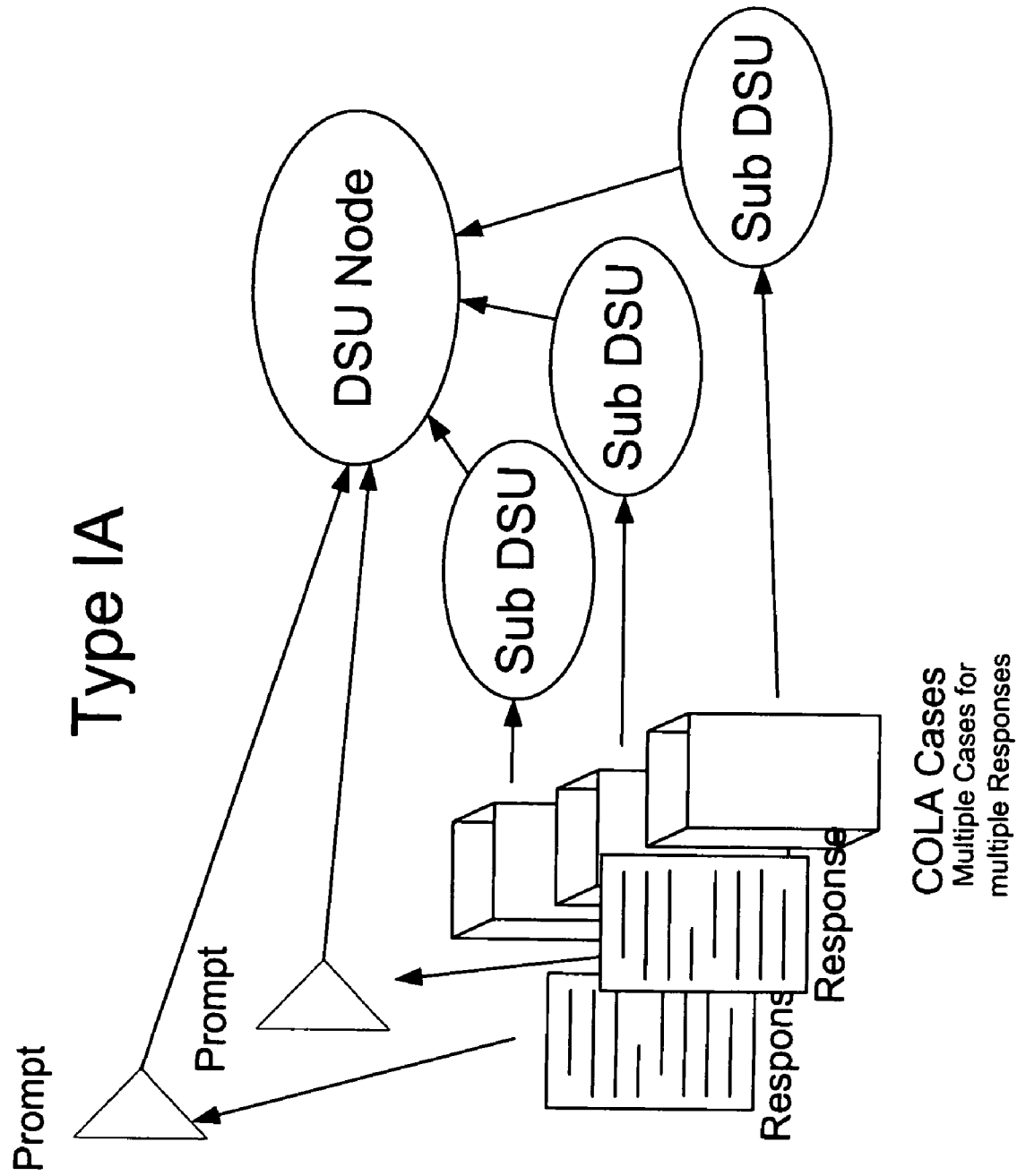
FIG. 17 illustrates a Type IA prompt that has multiple COLA cases for multiple prompts and multiple responses.
Figure 18:
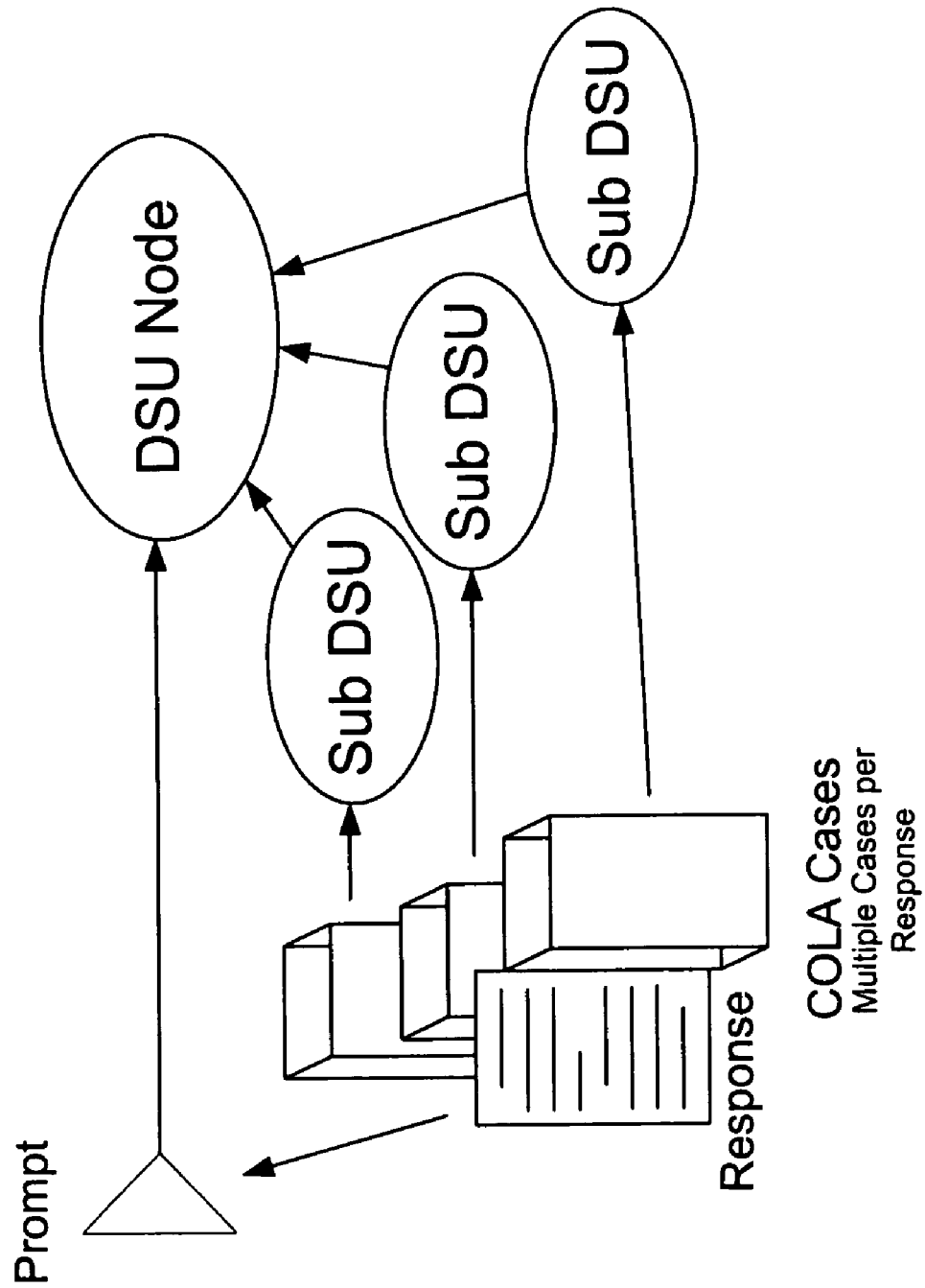
FIG. 18 illustrates a Type IIA prompt that provides for the evaluation of many cases for one response.

The DSU Hierarchy concept of the invention supports at least two other simple types of scoring. Relaxing the assumption that Prompts are associated with leaf levels of the DSU tree allows for a Prompt to have multiple DSUs (the prompt is associated with a DSU that has a set of sub DSUs). Semantically it means: "Here is a Prompt (or group of Prompts), and it is scored several different ways." This somewhat describes analytical scoring where a response gets scored in several different categories. For example, an elementary school essay may receive a score for grammar, spelling, handwriting, etc. In the COLA System, these are separate DSUs, which create, for one response, a Grammar Case, a Spelling Case, and a Handwriting Case, each of which has its own score(s). Because having a Prompt scored several different ways resembles analytical scoring, the types are named Type IA and Type IIA and are illustrated in FIGS. 17 and 18, respectively.

Figure 19:
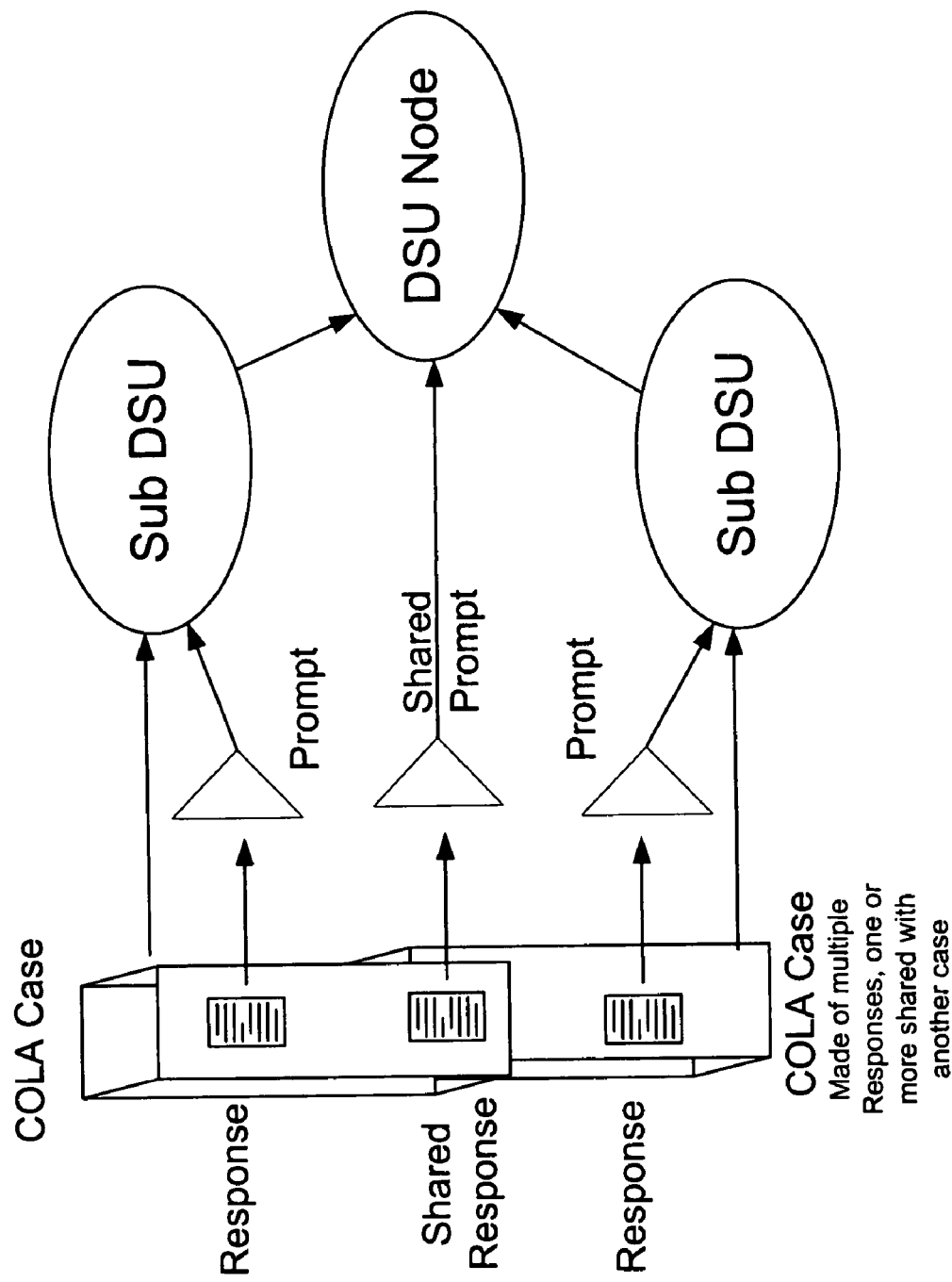
FIG. 19 illustrates a shared Type IA prompt that is scored in multiple ways (Analytical), and depending on the 'way' it is scored, it may be combined with other different prompts.

Shared Type IA:

Theoretically, allowing Type IA and Type IIA scoring opens a subtle variation, here dubbed Shared Type IA (FIG. 19). This occurs when a prompt is scored in multiple ways (Analytical); however depending on the 'way' it is scored, it may be combined with other different prompts (Type I). When looking from the perspective of the 'other different prompts', it looks as if they have to share the main prompt.

To make sense of all these different types, an example is provided.

TYPE EXAMPLE

Imagine a scenario for the NBPTS where a teacher candidate must submit a lesson plan, a videotape of her giving the lesson, and written commentary (post mortem analysis of the effectiveness of the lesson). The Prompts are defined as 1: Submit a Lesson Plan, 2: Video tape the lesson and submit tape, 3: Write an analysis of the effectiveness of the lesson.

Type I—Assessor receives all three items at once, scores them together (one case for many prompts).

Type II—Assessors evaluate the three items separately (one case for one prompt).

Type IA—Assessors evaluate all three items at once, but analyze the material several different ways and give a score for each way (many cases for many prompts).

Type IIA—Assessors evaluate the three items separately, and for each item they analyze the material several different ways and give a score for each way (many cases for one prompt).

Shared Type IA—Assessors evaluate the lesson plan and commentary separately, but include the video as part of both of the separate evaluations. There are two DSUs (lesson plan+video AND commentary+video), and each DSU has combined Prompts (Type I), but they share the video prompt (Shared), and since the video is scored in more than one-way, it is technically analytical (A).

DSU Organization

Figure 20:
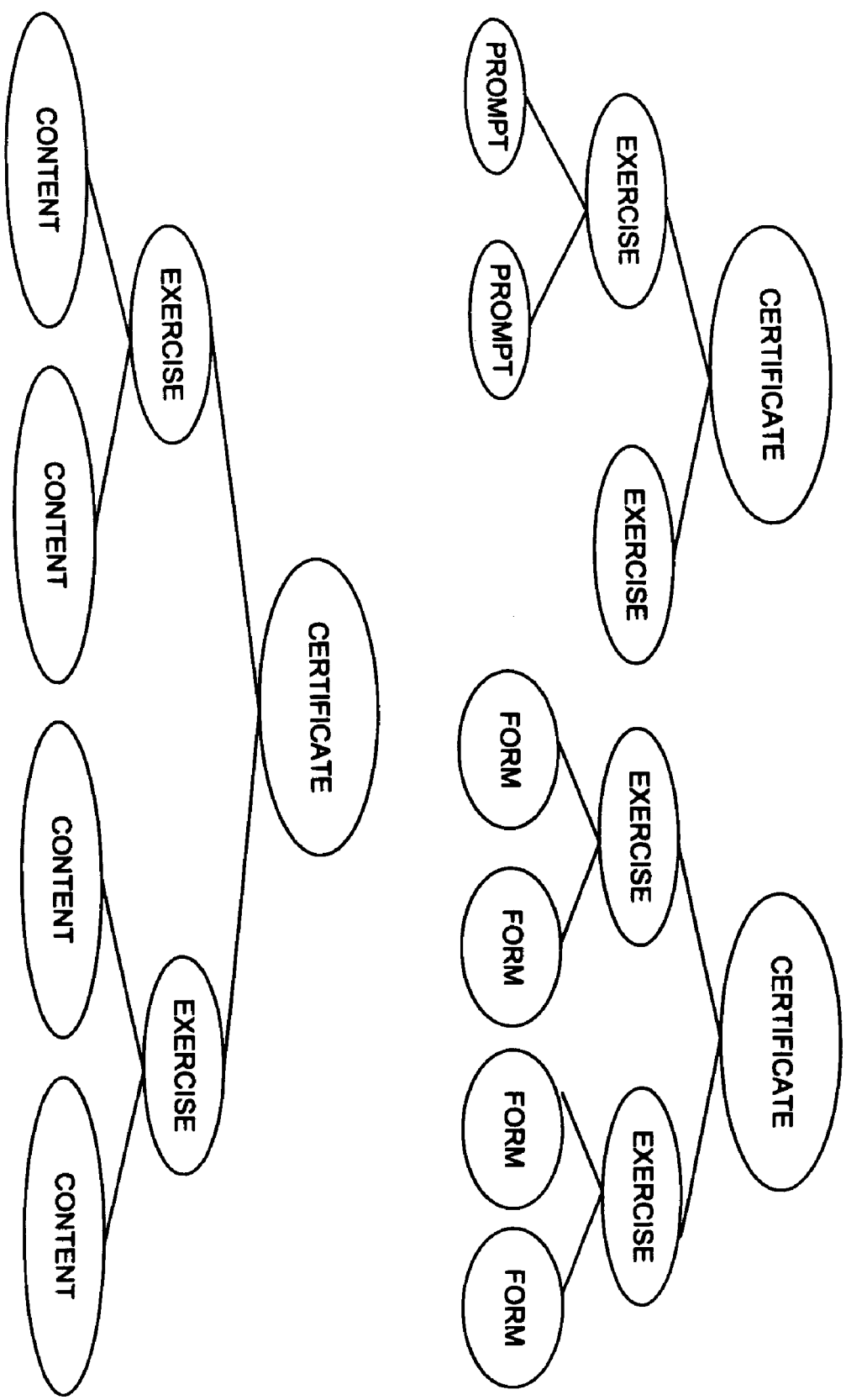
FIG. 20 illustrates a DSU Tree structure including a root node corresponding to the examination or certificate being pursued as well as the exercises, content and forms for such a DSU Tree structure.

As noted above, the DSU provides the organizational structure for a testing configuration in accordance with the invention. As shown in FIG. 20, The DSU Tree structure includes a root node corresponding to the examination or certificate being pursued, exercise nodes that are children of the root node, prompts or form nodes that are children of the exercise nodes, and any other required level of distinction (such as content nodes that are children of the exercise nodes and which function to specify subject matter areas of some exercises). Content nodes are typically used in those situations where a certificate assesses a candidate pool made up of people with different specialties. For example, a science certificate may have candidates who teach Biology, Chemistry, Physics, or Earth Science. Special education teachers may specialize in teaching children who are blind, deaf, etc. So for each exercise the developers write a set of items for each content area. Similarly, if a large number of people are to take a particular certificate, and since the questions/prompts of the certificate will be out in the field for a long period of time, in order to prevent unfair advantages, multiple variations of the exercises are created. For example, a hypothetical geology candidate may receive a series or questions concerning volcanoes, while another geology candidate answers questions about earthquakes. These variations are called Forms. As shown in FIG. 20, certain exercises for such a certificate will have more than one Form, each Form with its own series of Items. It is possible to have both multiple forms within a content area, such as when the volume of Biology candidates is high enough to warrant two variations of the biology variety. The DSU tree allows for breaking exercises into content areas, forms, or both.

In accordance with the invention, the DSU Tree allows for flexible hierarchies for organizing an assessment program in that the test configuration, scoring mode information, units of work (COLA Cases), and the like may be linked to the DSU for processing. The test configuration data may identify the tests or certificate, break down the test sections (exercises), and identify items presented to the test takers/candidates (questions/Prompts). The Scoring Model Information may assign tests or parts of tests to the various scoring models and specify specific exemplary cases required for each DSU. The DSU Property information may be used to track the DSU as it moves through the assessment life cycle from testing to benchmarking to scoring. The DSU is further used to separate COLA Cases for assignment to the Benchmarkers/Scorers/Assessors to work with a set of cases in that DSU.

Figure 21:
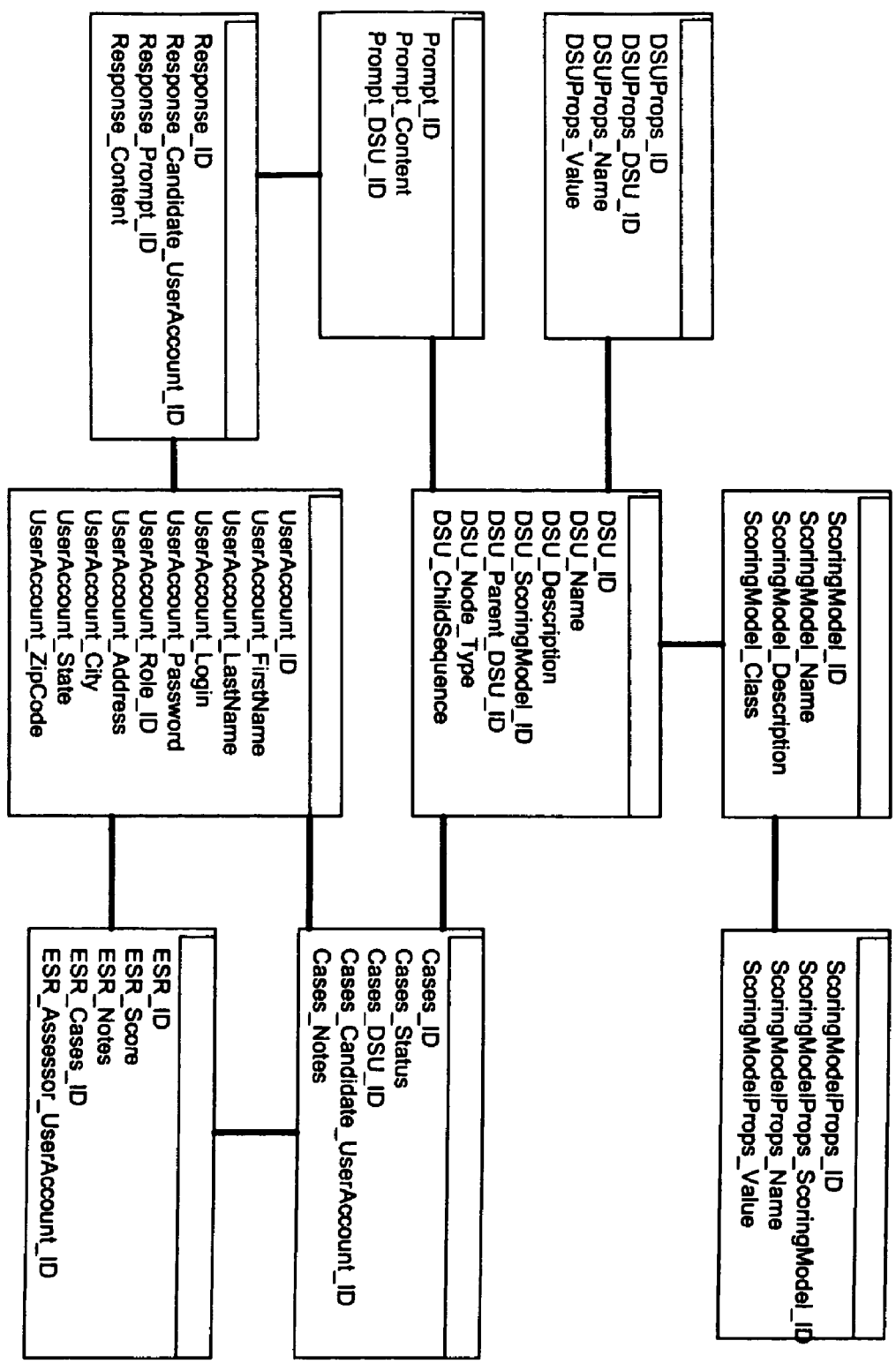
FIG. 21 illustrates the linkage of the data making up a COLA Case for respective DSUs in the DSU Table.

The DSU structure illustrated in FIG. 21 is a tree since it is possible to categorize items at varying levels. This is captured by nodes in the various branches of the tree. Because the DSU tree at its lowest (leaf) level organizes how items will be scored, and the unit of work that is scored is the COLA Case, it follows that COLA Cases relate to leaf nodes on the DSU Tree. When a user is assigned to a DSU, he or she has actually been assigned to a set of COLA Cases to do his or her work. Fundamentally, as a scoring system, the fundamental user is a scorer (Assessor). Assessors are trained to score cases of a particular type, and can score all cases of that type. Therefore, they are assigned to a leaf node, and cases of that type are related to that node. Even though an Assessor can score all cases of that type (within the DSU the assessor is assigned to) that does not mean the assessor should score all of those cases. The assessor should not score them if they are not ready, or have already been scored, and so the cases are distinguished not only by DSU, but also by status. For instance, a 'closed' status case has already received all the scores it needs, and will not be sent out for more scoring. A case with status 'awaitinghw' (hw=handwritten) is still waiting for the handwritten images to be loaded into the COLA System and assigned by Essay Processors, so it cannot be sent out either. So cases must be distinguished not just by the DSU, but also by status. All cases would be equal, provided that they were within the same DSU and same status, except for the fact that they were written by different people. So each case must be related to the candidate to which it belongs.

So the three most important fields of a case are Cases DSU ID, Cases Candidate User Account ID, and Cases Status. All of the other fields on the COLA Case contain identifying information, or denormalized scoring data to simplify data access for the COLA code base. As important a central component as the COLA Case is in the COLA System, it is made up of almost entirely relational, identifying, or denormalized informational data that symbolize a unit of work (which flows through states, hence the Cases Status field).

When an assessor receives a unit of work to score (imagine the algorithm that searches through the assessor's DSU to find a case in the appropriate status), obviously the essays that are to be evaluated must be delivered. The Cases Candidate User Account ID points to whose essays will be scored. The COLA Case's DSU indicates to which Prompts the essays must have been written. In an ideal world, the essays themselves would indicate whose essays they were and to which Prompt they were written, and those essays would be delivered to the assessor who received the case. In the COLA System, the Response table (which includes the essay text in Response Content) has two convenient fields: Response Prompt ID and Response Candidate User Account ID.

DSU EXAMPLE

FIG. 22 illustrates a sample DSU for a candidate identified by Candidate ID 00092500. This candidate is signed up to take the NBPTS, and this COLA DSU is identified as being of the type (or section) LITERATURE.ROM . As shown, this DSU includes three question, or accession, numbers CA031101, CA031102, and CA031103 with corresponding prompts. The center code identifies where the candidate took the test (Center I7700), and the date field informs the assessor that the test was taken on Jun. 21, 2000. In this example, the results from the three questions are combined for scoring. The first two questions and CRs are illustrated. Each question is scored with the same scoring rubric.

Those skilled in the art will appreciate that there are several key innovations embodied in the COLA System of the invention. The COLA System includes a rich is DSU tree structure for data representation and storage that is highly flexible and easily managed and maintained once in place. However, those skilled in the art will appreciate that the DSU tree structure may be replaced by a linked list or a graph structure so that a given node may inherit and pass on properties from a plurality of different nodes or elements.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. An object-oriented test assessment system, comprising:
a processor; and
a processor-readable storage medium,
wherein the processor-readable storage medium contains one or more programming instructions for performing a method of assessing constructed responses to test prompts, the method comprising:
loosely coupling items including received constructed responses, identities of test takers who created received constructed responses and scoring models for discrete scorable classifications to cases for assessment of the cases as objects, wherein the cases have different states corresponding to the status of the case in the assessment process,
manipulating one or more links between one or more loosely coupled items to change cases associated with the links, and
storing the cases in a database.

2. The assessment system of claim 1, wherein each constructed response relates to a prompt, wherein each prompt relates to at least one discrete scorable classification, and wherein the processor-readable storage medium further comprises one or more programming instructions for organizing the constructed responses into one or more sets of cases that are scored similarly.

3. The assessment system of claim 2, wherein the processor-readable storage medium further contains one or more progranuning instructions for associating the scoring model and the discrete scorable classifications with one another, wherein the scoring model defines business rules for scoring the constructed responses associated with the discrete scorable classifications associated with that scoring model.

4. The assessment system of claim 3, wherein the processor-readable storage medium further contains one or more programming instructions for distributing the case using the business rules of the associated scoring model.

5. The assessment system of claim 2, wherein the processor-readable storage medium further contains one or more programming instructions for enabling an assessor to create at least one scoring record that is linked to a corresponding case.

6. The assessment system of claim 5, wherein the scoring record includes one or more of written commentary from the assessor to justify a score, feedback commentary to the test taker, and a customizable form of scoring data.

7. The assessment system of claim 2, wherein the processor-readable storage medium further contains one or more programming instructions for correlating prompts to a discrete scorable classification tree based on how the constructed responses to the prompts are to be linked to a case, wherein branch nodes of the tree correspond to discrete scorable classifications having a Common scoring model, and wherein each leaf node of the tree corresponds to a set of cases scored similarly.

8. The assessment system of claim 7, wherein each leaf node and each branch node inherits the properties of a parent nod, and wherein correlating prompts to a discrete scorable classification tree comprises using a scoring model linked to a branch node of the tree to scare constructed responses to all prompts in leaf nodes of the branch node.

9. The assessment system of claim 8, wherein using a scoring model comprises relating a case to a corresponding discrete scorable classification for assessment by the assessor using the business rules inherited by the corresponding discrete scorable classification.

10. The assessment system of claim 7, wherein correlating prompts to a discrete scorable classification tree comprises:

grouping constructed responses to multiple related prompts; and scoring The grouped constructed responses as a single discrete scorable classification.

11. The assessment system of claim 7, wherein correlating prompts to a discrete scorable classification tree comprises scoring a constructed response to a single prompt as a discrete scorable classification.

12. The assessment system of claim 7, wherein correlating prompts to a discrete scorable classification tree comprises:

grouping constructed responses to multiple related prompts; and scoring the grouped constructed responses using the business rules of a plurality of discrete scorable classifications.

13. The assessment system of claim 1, wherein the processor-readable storage medium further contains one or more progranunmg instructions for enabling an administrator to modify the content of a case.

* * * * *

UNITED STATES PATENT AND TRADEMARK OFFICE
CERTIFICATE OF CORRECTION

PATENT NO. : 7,162,198 B2 Page 1 of 1
APPLICATION NO. : 10/948985
DATED : January 9, 2007
INVENTOR(S) : David L. Kuntz et al.

It is certified that error appears in the above-identified patent and that said Letters Patent is hereby corrected as shown below:

Title Page, the following item should be inserted after item (65):

--Related U.S. Application Data

(60) Continuation of Patent Application No. 10/098,636, filed on March 15, 2002, now Patent No. 6,816,702, issued on Nov. 9, 2004.--

Signed and Sealed this

Twentieth Day of April, 2010

David J. Kappos
*Director of the United States Patent and Trademark Office*